US011240422B2

United States Patent
Pellman et al.

(10) Patent No.: US 11,240,422 B2
(45) Date of Patent: Feb. 1, 2022

(54) METHOD AND SYSTEM FOR MULTIPLE F-NUMBER LENS

(71) Applicant: Magic Leap, Inc., Plantation, FL (US)

(72) Inventors: Asaf Pellman, Bet-Yehoshua (IL); Erez Tadmor, Atlit (IL); David Cohen, Nesher (IL); Giora Yahav, Haifa (IL)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/846,027

(22) Filed: Apr. 10, 2020

(65) Prior Publication Data

US 2020/0244857 A1   Jul. 30, 2020

Related U.S. Application Data

(63) Continuation of application No. 15/803,351, filed on Nov. 3, 2017, now Pat. No. 10,659,701.

(Continued)

(51) Int. Cl.
*H04N 9/64*   (2006.01)
*H04N 9/74*   (2006.01)
(Continued)

(52) U.S. Cl.
CPC ..... *H04N 5/232121* (2018.08); *G01S 7/4816* (2013.01); *G01S 7/4865* (2013.01);
(Continued)

(58) Field of Classification Search
CPC .......... H04N 5/2254; H04N 5/232121; H04N 5/23245; H04N 13/254; G01S 17/894;
(Continued)

(56) References Cited

U.S. PATENT DOCUMENTS 7,297,951 B2   11/2007  Chen et al.
9,063,574 B1*   6/2015  Ivanchenko .............. G06F 1/32
(Continued)

FOREIGN PATENT DOCUMENTS

CN   101631193 A   1/2010
EP   2916142 A1   9/2015
(Continued)

OTHER PUBLICATIONS

Kim et al. "A 640×480 image sensor with unified pixel architecture for 2D/3D imaging in 0.11 μm CMOS." 2011 Symposium on VLSI Circuits—Digest of Technical Papers. IEEE (Year: 2011).*
(Continued)

*Primary Examiner* — Fabio S Lima
(74) *Attorney, Agent, or Firm* — Kilpatrick Townsend & Stockton LLP

(57)   ABSTRACT

An imaging lens includes one or more lens elements configured to receive and focus light in a first wavelength range reflected off of one or more first objects onto an image plane, and to receive and focus light in a second wavelength range reflected off of one or more second objects onto the image plane. The imaging lens further includes an aperture stop and a filter positioned at the aperture stop. The filter includes a central region and an outer region surrounding the central region. The central region of the filter is characterized by a first transmission band in the first wavelength range and a second transmission band in the second wavelength range. The outer region of the filter is characterized by a third transmission band in the first wavelength range and substantially low transmittance values in the second wavelength range.

18 Claims, 19 Drawing Sheets

Related U.S. Application Data

(60) Provisional application No. 62/420,249, filed on Nov. 10, 2016.

(51) Int. Cl.

| | | |
|---|---|---|
| *H04N 5/232* | (2006.01) | |
| *G02B 27/00* | (2006.01) | |
| *G01S 7/481* | (2006.01) | |
| *H04N 13/254* | (2018.01) | |
| *G01S 17/894* | (2020.01) | |
| *G06T 7/521* | (2017.01) | |
| *G01S 7/4865* | (2020.01) | |
| *G01S 17/42* | (2006.01) | |
| *G02B 5/20* | (2006.01) | |
| *G02B 13/14* | (2006.01) | |
| *G02B 27/10* | (2006.01) | |
| *G02B 27/14* | (2006.01) | |
| *H04N 5/225* | (2006.01) | |
| *H04N 5/235* | (2006.01) | |
| *H04N 5/238* | (2006.01) | |
| *H04N 5/343* | (2011.01) | |
| *H04N 5/347* | (2011.01) | |
| *G02B 1/11* | (2015.01) | |
| *G02B 27/30* | (2006.01) | |
| *H04N 5/378* | (2011.01) | |

(52) U.S. Cl.
CPC ............ *G01S 17/42* (2013.01); *G01S 17/894* (2020.01); *G02B 5/208* (2013.01); *G02B 13/14* (2013.01); *G02B 27/0093* (2013.01); *G02B 27/1006* (2013.01); *G02B 27/141* (2013.01); *G06T 7/521* (2017.01); *H04N 5/2254* (2013.01); *H04N 5/2256* (2013.01); *H04N 5/238* (2013.01); *H04N 5/2351* (2013.01); *H04N 5/23245* (2013.01); *H04N 5/343* (2013.01); *H04N 5/347* (2013.01); *H04N 13/254* (2018.05); *G02B 1/11* (2013.01); *G02B 27/30* (2013.01); *H04N 5/378* (2013.01)

(58) Field of Classification Search
CPC .... G02B 27/0093; G02B 5/208; G02B 13/14; G02B 27/1006; G02B 27/141
See application file for complete search history.

(56) References Cited

U.S. PATENT DOCUMENTS

| | | | |
|---|---|---|---|
| 9,716,845 B2* | 7/2017 | Schlechter | G01S 17/894 |
| 9,784,822 B2* | 10/2017 | Metz | G01S 7/4808 |
| 10,659,701 B2 | 5/2020 | Pellman et al. | |
| 2003/0072161 A1 | 4/2003 | Hough et al. | |
| 2003/0205671 A1 | 11/2003 | Thomas et al. | |
| 2007/0023663 A1 | 2/2007 | Chen et al. | |
| 2010/0091490 A1 | 4/2010 | Reichel et al. | |
| 2012/0075427 A1 | 3/2012 | Yahav et al. | |
| 2013/0038881 A1 | 2/2013 | Pesach et al. | |
| 2014/0063332 A1* | 3/2014 | Miyawaki | H04N 5/2254 348/360 |
| 2014/0078459 A1* | 3/2014 | Kim | G02F 1/13475 349/193 |
| 2014/0104397 A1* | 4/2014 | Shin | H04N 9/045 348/49 |
| 2014/0118497 A1* | 5/2014 | Kim | H04N 9/045 348/46 |
| 2014/0253688 A1* | 9/2014 | Metz | G01S 7/4915 348/46 |
| 2015/0316473 A1 | 11/2015 | Kester et al. | |
| 2015/0356351 A1* | 12/2015 | Saylor | H04N 5/33 348/164 |
| 2015/0357360 A1 | 12/2015 | Tian et al. | |
| 2016/0019684 A1* | 1/2016 | Hudman | H04N 7/183 348/86 |
| 2016/0044253 A1* | 2/2016 | Dainty | G02B 5/005 348/349 |
| 2016/0092731 A1* | 3/2016 | Dainty | G02B 13/004 348/78 |
| 2016/0210509 A1 | 7/2016 | Hanna | |
| 2016/0262602 A1* | 9/2016 | Yu | A61B 1/0638 |
| 2016/0335778 A1* | 11/2016 | Smits | G01P 3/36 |
| 2017/0155873 A1* | 6/2017 | Nguyen | G01J 3/0224 |
| 2017/0352139 A1* | 12/2017 | Mrdjen | G02B 23/04 |
| 2018/0131853 A1 | 5/2018 | Pellman et al. | |
| 2018/0149833 A1 | 5/2018 | Lee et al. | |
| 2018/0180840 A1* | 6/2018 | Wada | G02B 5/208 |
| 2018/0199801 A1* | 7/2018 | Tsuruta | G02B 23/2469 |
| 2020/0096613 A1* | 3/2020 | Li | G01S 7/4814 |

FOREIGN PATENT DOCUMENTS

| | | |
|---|---|---|
| JP | 2002369223 A | 12/2002 |
| WO | 2018089266 A1 | 5/2018 |

OTHER PUBLICATIONS

U.S. Appl. No. 15/803,351, "Final Office Action", dated May 14, 2019, 14 pages.
U.S. Appl. No. 15/803,351, "Non-Final Office Action", dated Dec. 27, 2018, 22 pages.
U.S. Appl. No. 15/803,351, "Non-Final Office Action", dated Sep. 5, 2019, 17 pages.
U.S. Appl. No. 15/803,351, "Notice of Allowance", dated Jan. 13, 2020, 10 pages.
CN201780069250.2, "Office Action", English Translation, dated Nov. 2, 2020, 9 pages.
EP17869247.1, "Extended European Search Report", dated Oct. 31, 2019, 6 pages.
IL266393, "Office Action", English Translation, dated Dec. 21, 2020, 10 pages.
PCT/US2017/059951, "International Preliminary Report on Patentability", dated May 23, 2019, 8 pages.
PCT/US2017/059951, "International Search Report and Written Opinion", dated Jan. 12, 2018, 9 pages.

* cited by examiner

METHOD AND SYSTEM FOR MULTIPLE F-NUMBER LENS

CROSS-REFERENCES TO RELATED APPLICATIONS

This application is a continuation of U.S. patent application Ser. No. 15/803,351, filed on Nov. 3, 2017, now U.S. Pat. No. 10,659,701, issued on May 19, 2020, entitled "METHOD AND SYSTEM FOR MULTIPLE F-NUMBER LENS," which is a non-provisional of and claims the benefit of and priority to U.S. Provisional Patent Application No. 62/420,249, filed on Nov. 10, 2016, entitled "METHOD AND SYSTEM FOR MULTIPLE F-NUMBER LENS," which are hereby incorporated by reference in their entirety for all purposes.

BACKGROUND OF THE INVENTION

In optical systems, imaging lenses are utilized to collimate light, focus light, and the like. Despite the progress made in the development of optical systems, there is a need in the art for improved imaging lenses.

SUMMARY OF THE INVENTION

The present invention relates generally to imaging systems with a multiple f-number lens. According to an embodiment of the present invention, an imaging system includes a near infrared (NIR) light source configured to emit a plurality of NIR light pulses toward one or more first objects. A portion of each of the plurality of NIR light pulses may be reflected off of the one or more first objects. The imaging system further includes an imaging lens. The imaging lens includes one or more lens elements configured to receive and focus the portion of the each of the plurality of NIR light pulses reflected off of the one or more first objects onto an image plane, and to receive and focus visible light reflected off of one or more second objects onto the image plane. The imaging lens further includes an aperture stop, and a filter positioned at the aperture stop. The filter includes a central region with a first linear dimension, and an outer region surrounding the central region with a second linear dimension greater than the first linear dimension. The central region of the filter is characterized by a first transmission band in an NIR wavelength range and a second transmission band in a visible wavelength range. The outer region of the filter is characterized by a third transmission band in the NIR wavelength range and substantially low transmittance values in the visible wavelength range. The imaging system further includes an image sensor positioned at the image plane. The image sensor includes a two-dimensional array of pixels. The image sensor is configured to detect a two-dimensional intensity image of the one or more second objects in the visible wavelength range at an unbinned pixel resolution, and detect a time-of-flight three-dimensional image of the one or more first objects in the NIR wavelength range in a binned pixel resolution.

According to another embodiment of the present invention, an imaging lens includes one or more lens elements configured to receive and focus light in a first wavelength range reflected off of one or more first objects onto an image plane, and to receive and focus light in a second wavelength range reflected off of one or more second objects onto the image plane. The imaging lens further includes an aperture stop, and a filter positioned at the aperture stop. The filter includes a central region with a first linear dimension, and an outer region surrounding the central region with a second linear dimension greater than the first linear dimension. The central region of the filter is characterized by a first transmission band in the first wavelength range and a second transmission band in the second wavelength range. The outer region of the filter is characterized by a third transmission band in the first wavelength range and substantially low transmittance values in the second wavelength range.

According to a yet another embodiment of the present invention, a method of operating an imaging system is provided. The imaging system includes a near infrared (NIR) light source, an imaging lens, and an image sensor positioned at an image plane of the imaging lens. The method includes performing three-dimensional sensing using the imaging system by: emitting, using the NIR light source, a plurality of NIR light pulses toward one or more first objects, wherein a portion of each of the plurality of NIR light pulses is reflected off of the one or more first objects, receiving and focusing, using the imaging lens, the portion of each of the plurality of NIR light pulses reflected off of the one or more first objects onto the image sensor, and detecting, using the image sensor, a three-dimensional image of the one or more first objects by determining a time of flight for the portion of each of the plurality of NIR light pulses from emission to detection. The imaging lens includes an aperture stop and a wavelength-selective filter positioned at the aperture stop. The wavelength-selective filter has a first region and a second region surrounding the first region. The wavelength-selective filter is configured to transmit NIR light through the first region and the second region, and to transmit visible light through the first region only. The method further includes performing computer vision using the imaging system by: receiving and focusing, using the imaging lens, visible light from ambient light source reflected off of one or more second objects onto the image sensor, and detecting, using the image sensor, a two-dimensional intensity image of the one or more second objects.

According to a further embodiment of the present invention, an image sensor for sensing light in a first wavelength range and a second wavelength range includes a two-dimensional array of pixels and a processor. The processor is configured to measure light intensity for each pixel of the array of pixels in the first wavelength range, and measure light intensities in the second wavelength range for a set of pixel groups. Each pixel group includes m×n pixels of the array of pixels, where m and n are integers, and at least one of m and n is greater than one. In some embodiments, the first wavelength range corresponds to visible wavelengths, and the second wavelength range corresponds to near infrared (NIR) wavelengths. In some embodiments, m is equal to two, and n is equal to two. In some embodiments, measuring light intensities in the second wavelength range for the set of pixel groups includes reading out a total amount of charge for each group of m×n pixels. In some alternative embodiments, measuring light intensities in the second wavelength range for the set of pixel groups includes reading out an amount of charge for each pixel of the array of pixels, and calculating a total amount of charge for each group of m×n pixels by summing the amount of charge of the m×n pixels in each group.

Numerous benefits are achieved by way of the present invention over conventional techniques. For example, embodiments of the present invention provide an imaging lens that may be characterized by a lower f-number for NIR light and a higher f-number for visible light by utilizing a wavelength-selective filter at its aperture stop. Moreover, embodiments of the present invention provide an image sensor that may be operated at a lower resolution mode for NIR light using pixel binning and at a higher resolution mode for visible light using native pixel resolution. The imaging lens and the image sensor may be suitable for use as a TOF depth sensor with active illumination in the NIR wavelength range where a faster lens and more light integration are desired, as well as a computer vision sensor with passive illumination in the visible wavelength range where higher image resolution and greater depth of field are desired. The imaging lens may be suitable for use for both imaging visible light at a lower photo speed and imaging IR light at a faster photo speed. These and other embodiments of the invention along with many of its advantages and features are described in more detail in conjunction with the text below and attached figures.

DETAILED DESCRIPTION OF SPECIFIC EMBODIMENTS

The present invention relates generally to imaging systems with a multiple f-number lens. In optics, the f-number (sometimes referred to as the focal ratio, f-ratio, f-stop, or relative aperture) of a lens is the ratio of the lens's focal length to the diameter of the entrance pupil. The f-number is a dimensionless number that is a quantitative measure of lens speed. Thus, the f-number or $f/\#$ is given by:

$$f/\# = \frac{f}{D},$$

where $f$ is the focal length, and D is the diameter of the entrance pupil (effective aperture). A higher f-number implies a smaller diameter stop for a given focal-length lens. Since a circular stop has area $A=\pi r^2$, doubling the aperture diameter and therefore halving the f-number will admit four times as much light into the system. Conversely, increasing the f-number of an imaging lens decreases the amount of light entering a camera by decreasing the aperture size. For example, doubling the f-number will admit ¼ as much light into the system.

To maintain the same photographic exposure when doubling the f-number, the exposure time would need to be four times as long, or alternatively, the illumination would need to be increased to a level four times as high as the original level. Increasing the f-number may have the benefit of increasing the depth of field (DoF) and increasing the spatial resolution of an image (e.g., as measured by modulation transfer function or MTF).

Figure 1:
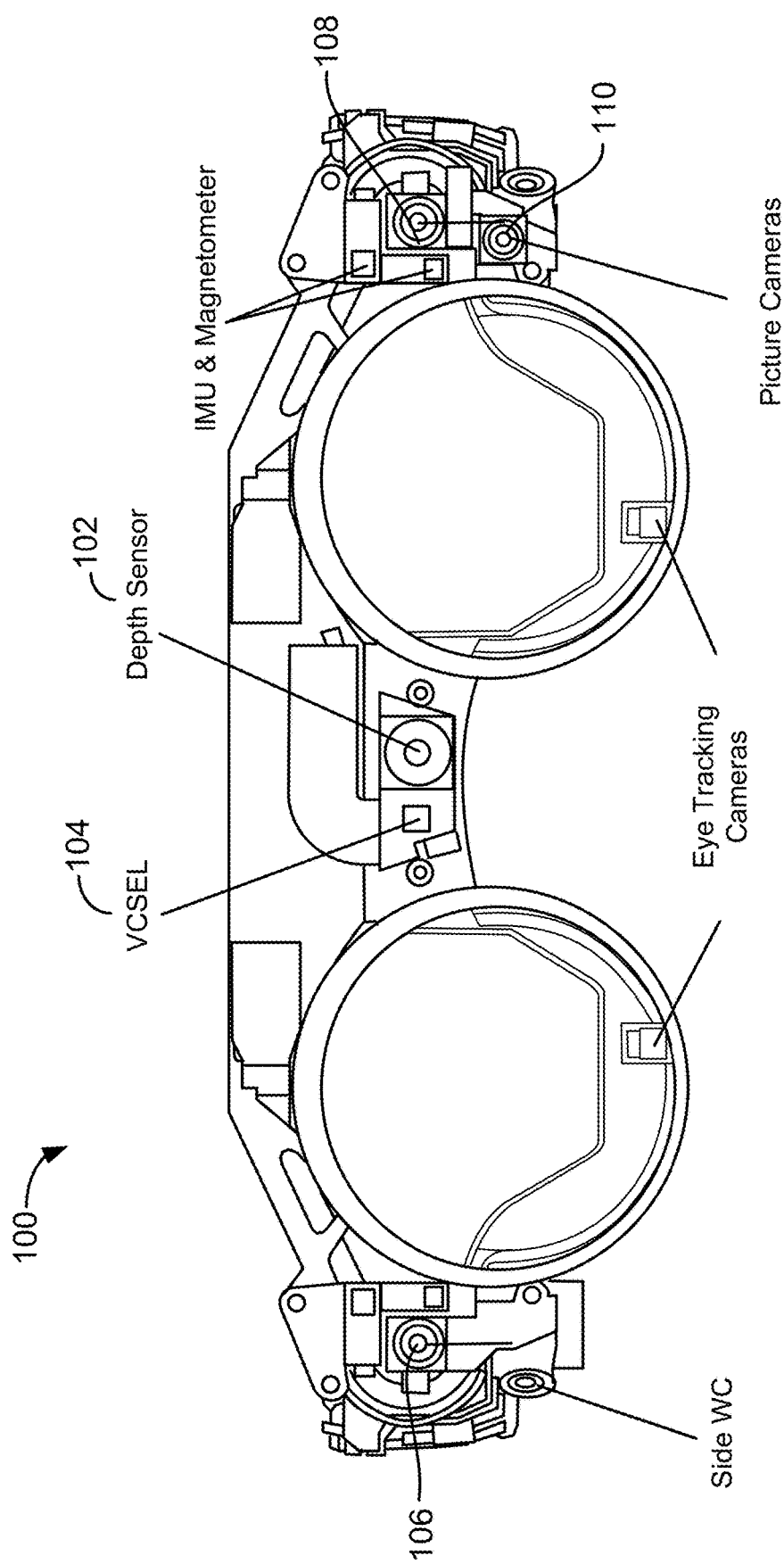
FIG. 1 illustrates schematically a system including an imaging system according to an embodiment of the present invention.

FIG. 1 illustrates schematically a system 100 that includes an imaging system 102 and an illumination source 104 according to an embodiment of the present invention. The system 100 may be integrated in a goggle, as illustrated in FIG. 1, that can be worn by a user for virtual reality (VR) or augmented reality (AR) experiences. The system 100 may include other optical and electronic components for creating VR and AR experiences.

In one embodiment, the imaging system 102 and the illumination source 104 may be used for time-of-flight (TOF) depth sensing. The illumination source 104 can be configured to emit a plurality of laser pulses. A portion of each of the plurality of laser pulses may be reflected off of an object in front of the user. The portion of each of the plurality of laser pulses reflected off of one or more objects may be received and imaged by the imaging system 102. The imaging system 102 can be configured to determine a time of flight for each of the laser pulses from emission to detection, thereby determining the distance of the object from the user. The illumination source 104 may comprise a laser source, such as a vertical-cavity surface-emitting laser (VCSEL). In some embodiments, the laser source may be configured to emit laser pulses in the near infrared (NIR) wavelength range, for example in the wavelength range from about 750 nm to about 1400 nm. The illumination source 104 may also include a collimation lens for collimating the plurality of laser pulses.

In some embodiments, the imaging system 102 may also be used for computer vision. When used for computer vision, the imaging system 102 is configured to image objects in front of the user that are illuminated by passive ambient light in the visible wavelength range. By using a shared imaging system for both TOF depth sensing and computer vision, lower cost and more compact system design may be realized. It should be understood that, although the imaging system 102 is described above as part of an AR or VR system, the imaging system 102 may be used in other systems. In other embodiments, the world cameras (WC) 106 and 108, as well as the picture camera 110, may also be configured for dual functions, i.e., for imaging both visible and infrared light.

In some embodiments, the system 100 may operate the imaging system 102 in a time-shared fashion such that depth sensing and computer vision are alternately performed at different time slots. In some embodiments, the duration of each time slot may range from about 1 ms to about 50 ms, so that there is no significant latency in either depth sensing or computer vision. In other embodiments, the system 100 may operate the imaging system 102 to perform depth sensing and computer vision simultaneously, as described in more detailed below.

Figure 2:
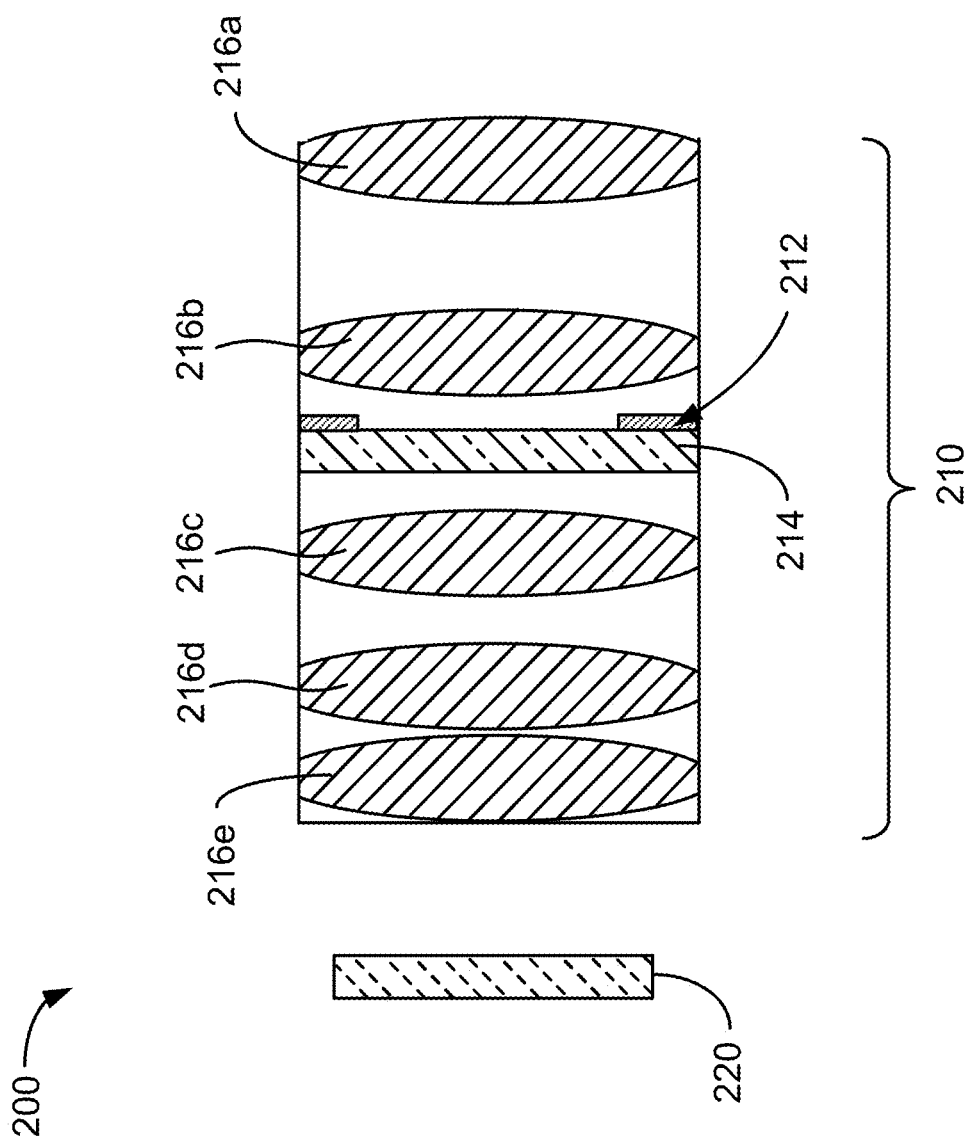
FIG. 2 illustrates schematically an imaging system including an imaging lens and an image sensor according to an embodiment of the present invention.

FIG. 2 illustrates schematically an imaging system 200 that may be used for dual-wavelength sensing according to some embodiments of the present invention. For example, the imaging system 200 may be used for both TOF depth sensing in the NIR wavelength range and computer vision in the visible wavelength range. The imaging system 200 includes an imaging lens 210 and an image sensor 220 positioned at an image plane of the imaging lens 210. The imaging lens 210 may include one or more lens elements 216a-216e disposed along an optical axis. The imaging lens may further include an aperture stop 212 that may define the entrance pupil size. In a lens system, the limiting diameter that determines the amount of light that reaches the image is called the aperture stop. In some embodiments, the aperture stop may be positioned near the front of a compound imaging lens. In some other embodiments, the aperture stop may be positioned between two groups of lens elements of a compound imaging lens (e.g., as illustrated in FIG. 2). In such cases, the entrance pupil size is determined by the image of the aperture stop formed by the lens elements preceding the aperture stop. In the following, it is assumed that the entrance pupil size is the same as the aperture stop size.

When the imaging system 200 is used for TOF depth sensing, it may be advantageous to configure the imaging lens 210 as a fast lens so that a relatively low power laser source may be used for active illumination. Lower power illumination may lead to lower cost, smaller form factor, and lower power consumption, among other advantages. In some cases, a relatively low $f/\#$, for example in a range from about $f/1$ to about $f/1.4$, may be desirable for TOF depth sensing. In contrast, when the imaging system 200 is used for computer vision, it may be advantageous to configure the imaging lens 210 as a slow lens so that higher spatial resolution and greater depth of field (DoF) may be achieved. In some cases, a relatively high $f/\#$, for example in a range from about $f/2$ to about $f/2.8$, may be desirable for computer vision. The imaging system 200 may be applied to other applications where it may be desirable to have different lens speeds for sensing light in different wavelength ranges (e.g., for infrared sensing and visible light sensing).

Figure 3:
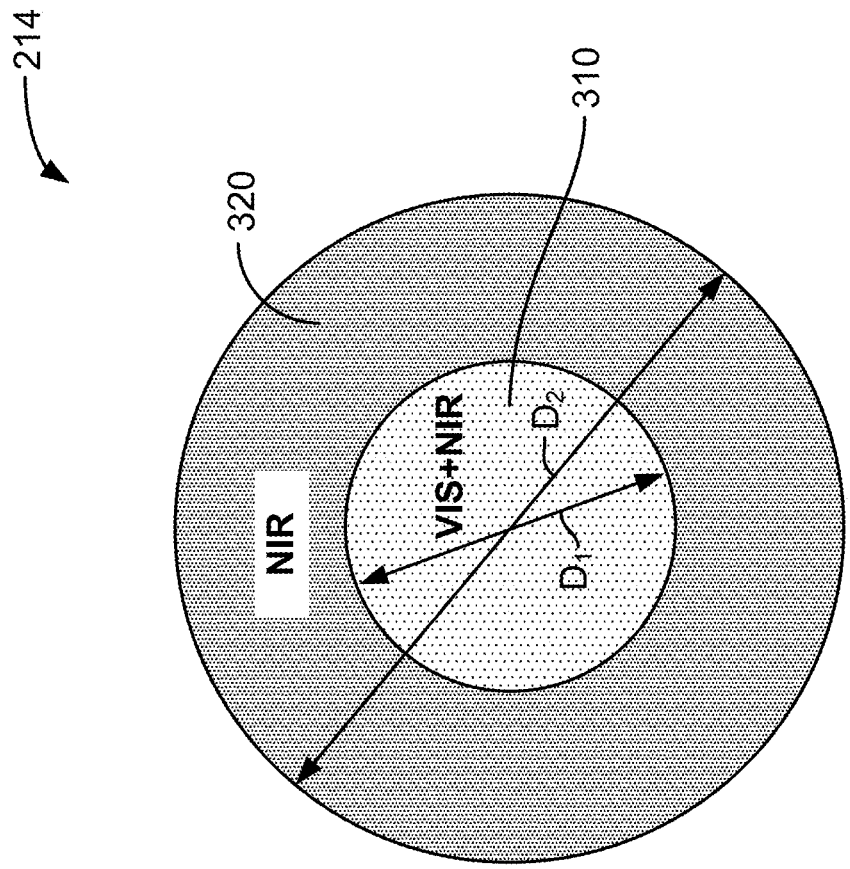
FIG. 3 shows a schematic plan view of a wavelength-selective filter that may be used in an imaging lens according to an embodiment of the present invention.

According to an embodiment of the present invention, the imaging lens 210 includes a filter 214 positioned at the aperture stop 212 that may function as a wavelength selective filter. FIG. 3 shows a schematic plan view of a filter 214 that may be used in the imaging lens 210 according to an embodiment of the present invention. The filter 214 may include two regions: a central (e.g., circular) region 310 with a first diameter $D_1$, and an outer (e.g., annular) region 320 surrounding the central region 310. The outer region 320 is characterized by a second diameter $D_2$ as its outer diameter. The second diameter $D_2$ may be substantially the same as the diameter of the aperture stop 212. It should be understood that, although the central region 310 is depicted as having a circular shape in FIG. 3, other shapes, such as elliptical, square, rectangular shapes can also be used. Similarly, although the outer region 320 is depicted as having an annular shape in FIG. 3, other shapes are also possible.

Figure 4A:
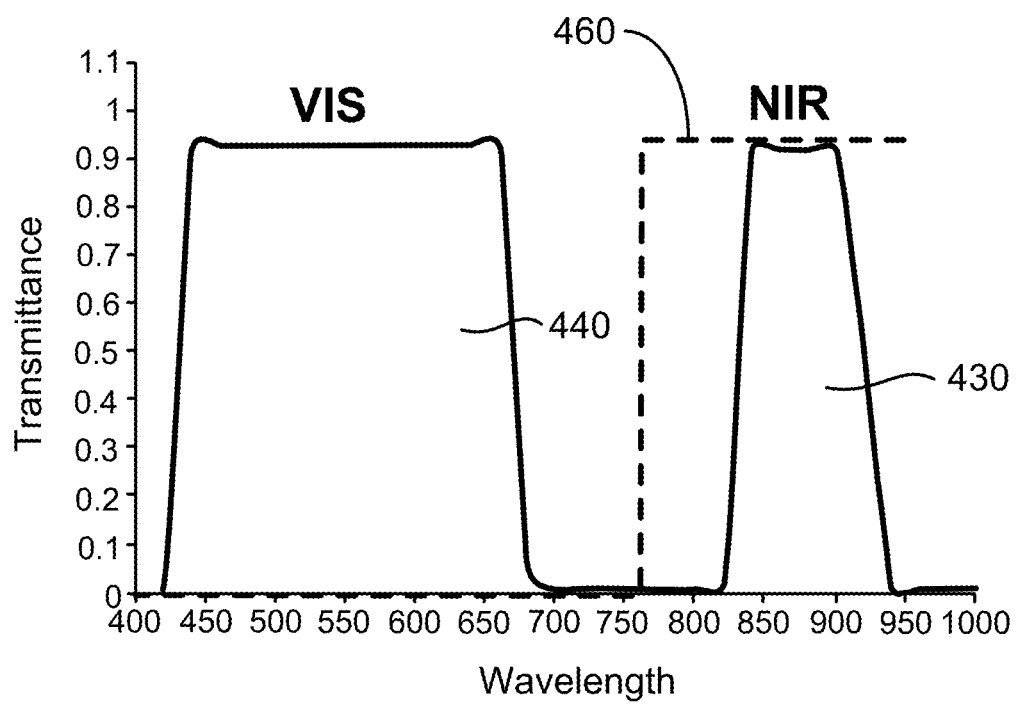
FIG. 4A is a simplified plot illustrating a transmittance curve as a function of wavelength for a central region of the wavelength-selective filter illustrated in FIG. 3, according to an embodiment of the present invention.
Figure 4B:
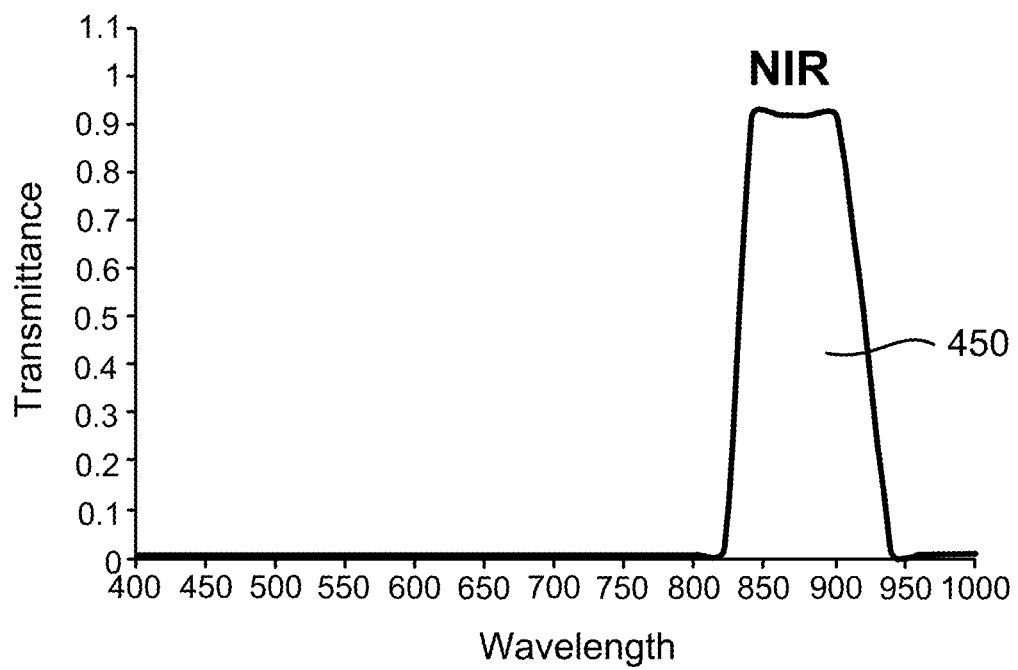
FIG. 4B is a simplified plot illustrating a transmittance curve as a function of wavelength for an outer region of the wavelength-selective filter illustrated in FIG. 3, according to an embodiment of the present invention.

FIG. 4A is a plot of an exemplary transmittance curve as a function of wavelength for the central region 310 of the filter 214 according to an embodiment of the present invention. FIG. 4B is a plot of an exemplary transmittance curve as a function of wavelength for the outer region 320 of the filter 214 according to an embodiment of the present invention. As illustrated in FIG. 4A, the central region 310 of the filter 214 may be configured to have a first transmission band 430 in the NIR wavelength range (e.g., from about 800 nm to about 950 nm) and a second transmission band 440 in the visible (VIS) wavelength range (e.g., from about 400 nm to about 700 nm). Accordingly, the central region 310 may be characterized by high transmittance values in both the NIR and the visible wavelength ranges. As illustrated in FIG. 4B, the outer region 320 may be configured to have only one transmission band 450 in the NIR wavelength range (e.g., from about 800 nm to about 950 nm), such that the outer region 320 is characterized by high transmittance values in the NIR wavelength range but low transmittance values in the visible wavelength range.

In some embodiments, the filter 214 may comprise a multilayer thin film stack formed on a surface of a transparent substrate such as glass. A multilayer thin film may comprise a periodic layer system composed from two or more materials of differing indices of refraction. This periodic system may be engineered to significantly enhance the transmittance of the surface in one or more desired wavelength ranges, while suppressing the transmittance of the surface in other wavelength ranges. The maximum transmittance may be increased up to nearly 100% with increasing number of layers in the stack. The thicknesses of the layers making up the multilayer thin film stack are generally quarter-wave, designed such that transmitted beams constructively interfere with one another to maximize transmission and minimize reflection. In one embodiment, the multilayer thin film stack in the central region 310 may be engineered to have two high transmittance bands, one in the visible wavelength range and the other in the NIR wavelength range, and have low transmittance for all other wavelengths. The multilayer thin film stack in the annular region 320 may be engineered to have only one high transmittance band in the NIR wavelength range, and have low transmittance for all other wavelengths. In other embodiments, other types of bandpass filters, such as metasurface filter, may be used.

Figure 5:
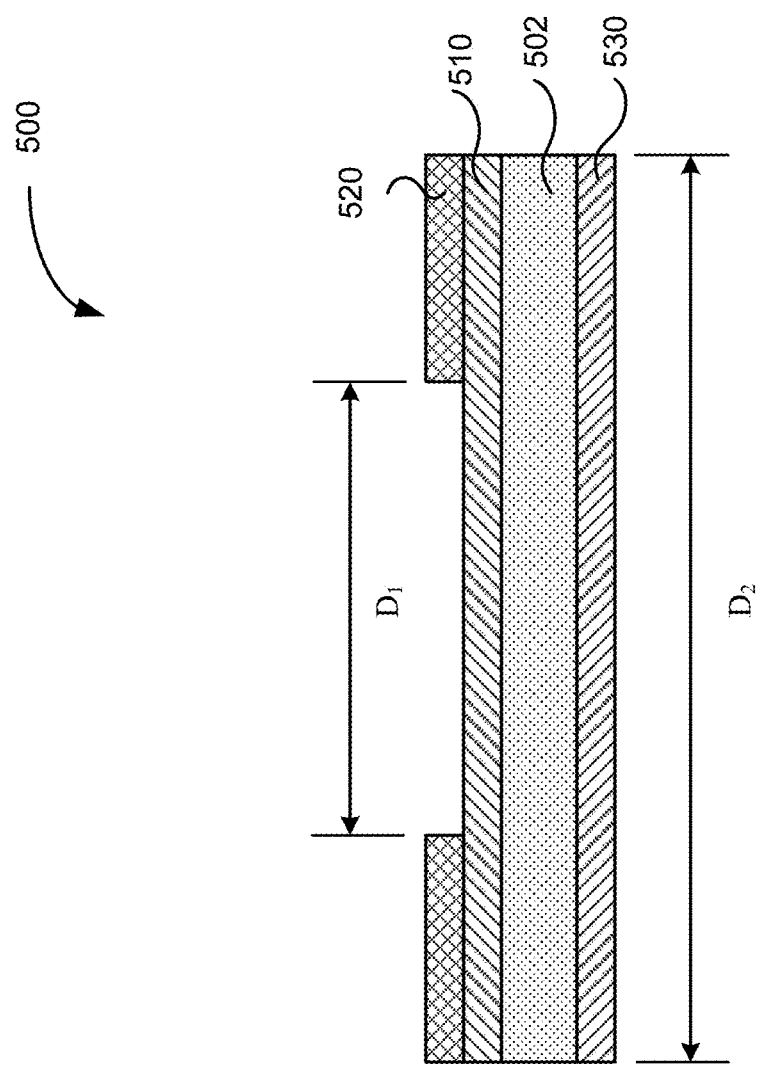
FIG. 5 illustrates a schematic cross-sectional view of a wavelength-selective filter according to some embodiments of the present invention.

FIG. 5 illustrates a schematic cross-sectional view of a wavelength-selective filter 500 according to some embodiments of the present invention. The filter 500 may include a transparent substrate 502 such as a piece of glass, a first multilayer thin film 510 disposed on a front surface of the substrate 502, and a second multilayer thin film 520 disposed on the first multilayer thin film 510. The first multilayer thin film 510 may have a circular shape with a diameter $D_2$. The second multilayer thin film 520 may have an annular shape with an inner diameter $D_1$ and an outer diameter $D_2$. In some embodiments, the filter 500 may further include an anti-reflective coating 530 on the back surface of the substrate 502.

The first multilayer thin film 510 may be configured to have a transmittance curve that exhibits a first transmission band 430 in the NIR wavelength range (e.g., about 800 nm to about 950 nm) and a second transmission band 440 in the visible (VIS) wavelength range (e.g., about 400 nm to about 700 nm), as illustrated in FIG. 4A. The second multilayer thin film 520 may be configured as a high-pass filter that transmits light in the NIR wavelength range and blocks light in the visible wavelength range, as illustrated by the dashed curve 460 in FIG. 4A. As such, the combination of the first multilayer thin film 510 and the second multilayer thin film 520 may result in an effective transmittance curve 450 as illustrated in FIG. 4B for the outer region of the filter 500. Thus, the outer region of the filter 500 may effectively transmit only light in the NIR wavelength range, while the central region of the filter 500 may transmit light in both visible and NIR wavelength ranges.

When the filter 214 or 500 is positioned at the aperture stop 212 in the imaging lens 210 as illustrated in FIG. 2, the filter 214 or 500 may effectively give rise to two different apertures for the imaging lens 210 depending on the wavelength range of the light being imaged. Referring to FIGS. 3 and 4A-4B, when the imaging lens 210 is used for imaging NIR light, for example for TOF depth sensing where the illumination laser source 104 (as illustrated in FIG. 1) operates in the NIR wavelength range, the NIR light is transmitted through both the central region 310 and the outer region 320 of the filter 214. Thus, the effective aperture of the imaging lens 210 for NIR light is the second diameter $D_2$. When the imaging lens 210 is used for imaging visible light, for example for computer vision where the illumination is from the ambient visible light, the visible light is transmitted only through the central region 310. Thus, the effective aperture of the imaging lens 210 for visible light is the first diameter $D_1$. The imaging lens 210 with the wavelength-selective filter 214 may be applied to other applications where it may be desirable to have different lens speeds for sensing light in different wavelength ranges.

Assume that the imaging lens 210 has a focal length $f$. When the imaging lens is used for imaging visible light, the imaging lens 210 may be characterized by a first $f/\#$ for visible light given by, $$f/\#_{VIS} = \frac{f}{D_1}.$$

When the imaging lens is used for imaging NIR light, the imaging lens 210 may be characterized by a second $f/\#$ for NIR light given by, $$f/\#_{NIR} = \frac{f}{D_2}.$$

Thus, the imaging lens 210 can be configured to have a relatively low $f/\#_{NIR}$ for TOF depth sensing in the NIR wavelength range, and a relatively high $f/\#_{VIS}$ for computer vision in the visible wavelength range. For TOF depth sensing, a lower $f/\#$ means that more active illumination NIR light can pass through the imaging lens 210. Therefore a relatively low power laser source may be used for illumination, which may lead to lower cost, smaller form factor, and lower power consumption, among other advantages. In some embodiments, the value of $D_2$ may be chosen such that $f/\#_{NIR}$ is in a range from about $f/1$ to about $f/1.4$.

For computer vision in the visible wavelength rage, a higher $f/\#$ may afford higher spatial resolution at the image plane (e.g., as measured by MTF) and greater DoF, among other advantages. In fact, a lower $f/\#$ may not be desired when imaging visible light in some cases. As described more fully below, image sensors typically have higher quantum efficiencies in the visible wavelength range than in the NIR wavelength range. Thus, the image sensor may be saturated when a fast lens is used for imaging visible light. In some embodiments, the value of $D_1$ may be chosen such that $f/\#_{VIS}$ is in a range from about $f/2$ to about $f/2.8$. The intensity ratio between VIS and NIR modes can be controlled by setting the ratio $D_1/D_2$ accordingly. In some embodiments, a ratio of $D_1/D_2$ may be chosen to be in the range from about 0.4 to about 0.6. In one embodiment the ratio of $D_1/D_2$ may be chosen to be about 0.5, so that the value of $f/\#_{VIS}$ is about twice as large as the value of $f/\#_{NIR}$.

Figure 6:
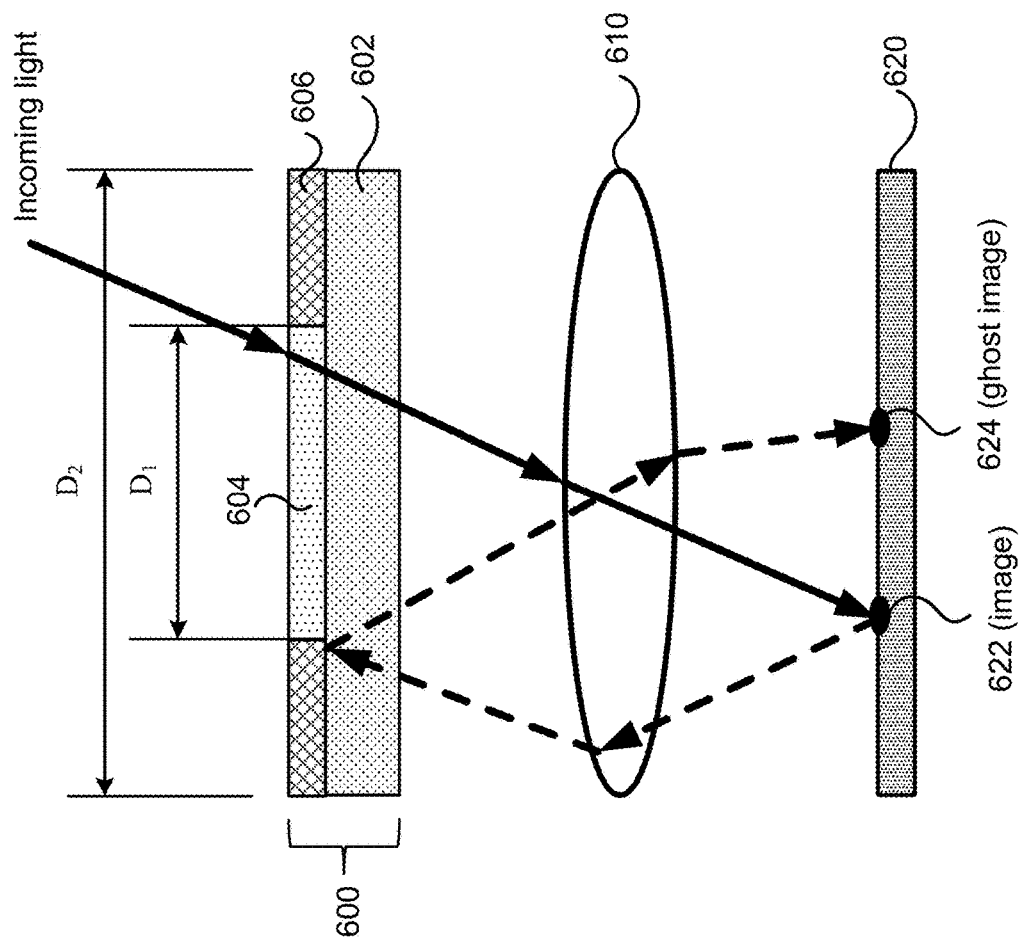
FIG. 6 illustrates a schematic imaging system according to some embodiments of the present invention.

FIG. 6 illustrates a schematic imaging system according to some embodiments. The imaging system may include a wavelength-selective filter 600, an optical lens 610, and an image sensor 620. Although a single lens element is depicted for the optical lens 610 in FIG. 6 for simplicity of illustration, the optical lens 610 may include several lens elements. The filter 600 may include a transparent substrate 602 such as a piece of glass, a first multilayer thin film 604 that has a circular shape with a first diameter $D_1$, and a second multilayer thin film 606 that has an annular shape surrounding the first multilayer thin film 604 with an outer diameter of $D_2$. The first multilayer thin film 604 may be configured to have high transmittance for both the visible and NIR wavelength ranges, and the second multilayer thin film 606 may be configured to have high transmittance for only the NIR wavelength range, as discussed above.

As illustrated in FIG. 6, an incoming light ray in the visible wavelength range may be transmitted by the first multilayer thin film 604 and form an image spot 622 at the image sensor, as illustrated by the light path represented by the solid arrows. A portion of the incoming light may be reflected by the image sensor 620 and incident on a back side of the second multilayer film 606, as illustrated by the light path represented by the dashed arrows. For incoming light in the visible wavelength range, the reflected light may be reflected by the second multilayer thin film 606, as the second multilayer thin film 606 is configured to have low transmittance values and high reflectance values in the visible wavelength range. The light reflected by the second multilayer thin film 606 may form a ghost image 624 at the image sensor 620. Note that, for incoming light in the NIR wavelength range, the portion of the light reflected by the image sensor 620 and incident on the back side of the second multilayer thin film 606 will be mostly transmitted by the second multilayer thin film 606, as the second multilayer thin film 606 is configured to have high transmittance values in the NIR wavelength range. Thus, the filter 600 may not present a significant ghost image problem for light in the NIR wavelength range.

Figure 7:
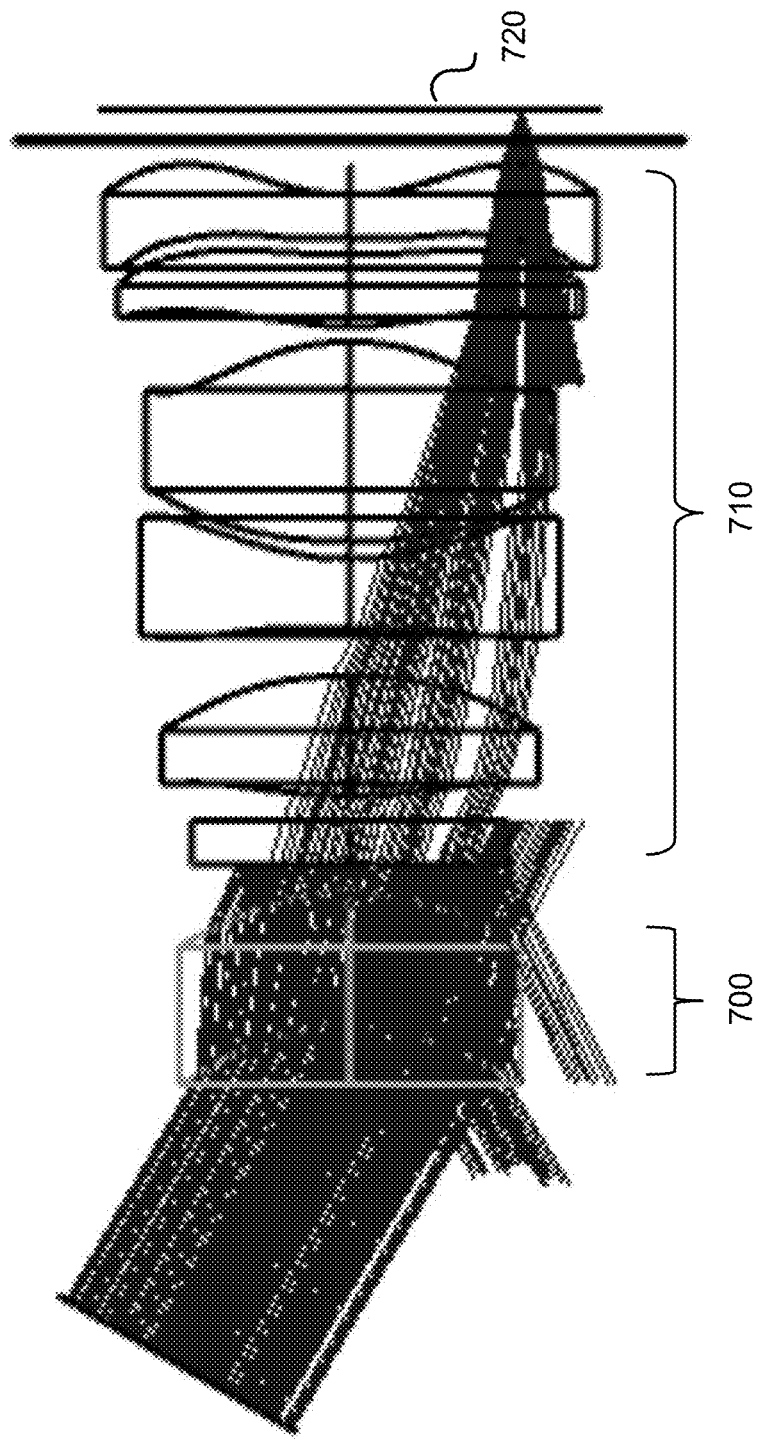
FIG. 7 shows a ray tracing diagram of an exemplary imaging system for a field point (e.g., collimated rays at a certain incidence angle) according to some embodiments of the present invention.
Figure 8:
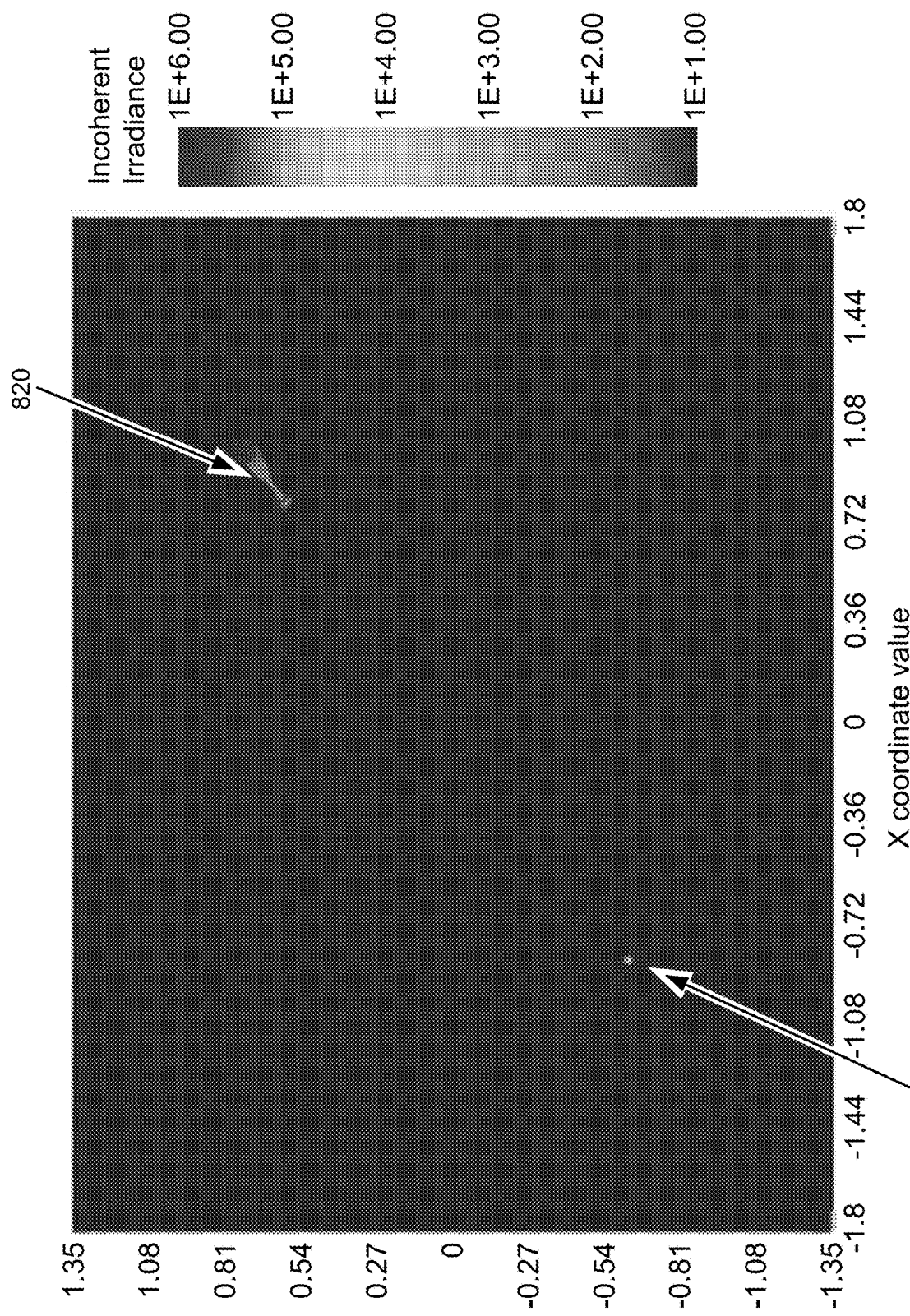
FIG. 8 shows intensity distributions at the image sensor as simulated by the ray tracing according to some embodiments of the present invention.

FIG. 7 shows a ray tracing diagram of an exemplary imaging system for a field point (e.g., collimated rays at a certain incidence angle) according to some embodiments. The image system may include a wavelength-selective filter 700, an optical lens 710, and an image sensor 720. FIG. 8 shows intensity distributions at the image sensor 720 as simulated by the ray tracing. As illustrated, the intensity distributions show an image point 810, as well as a ghost image 820. The ghost image may obscure the real image. Therefore, it may be desirable to prevent the formation of the ghost image.

Figure 9:
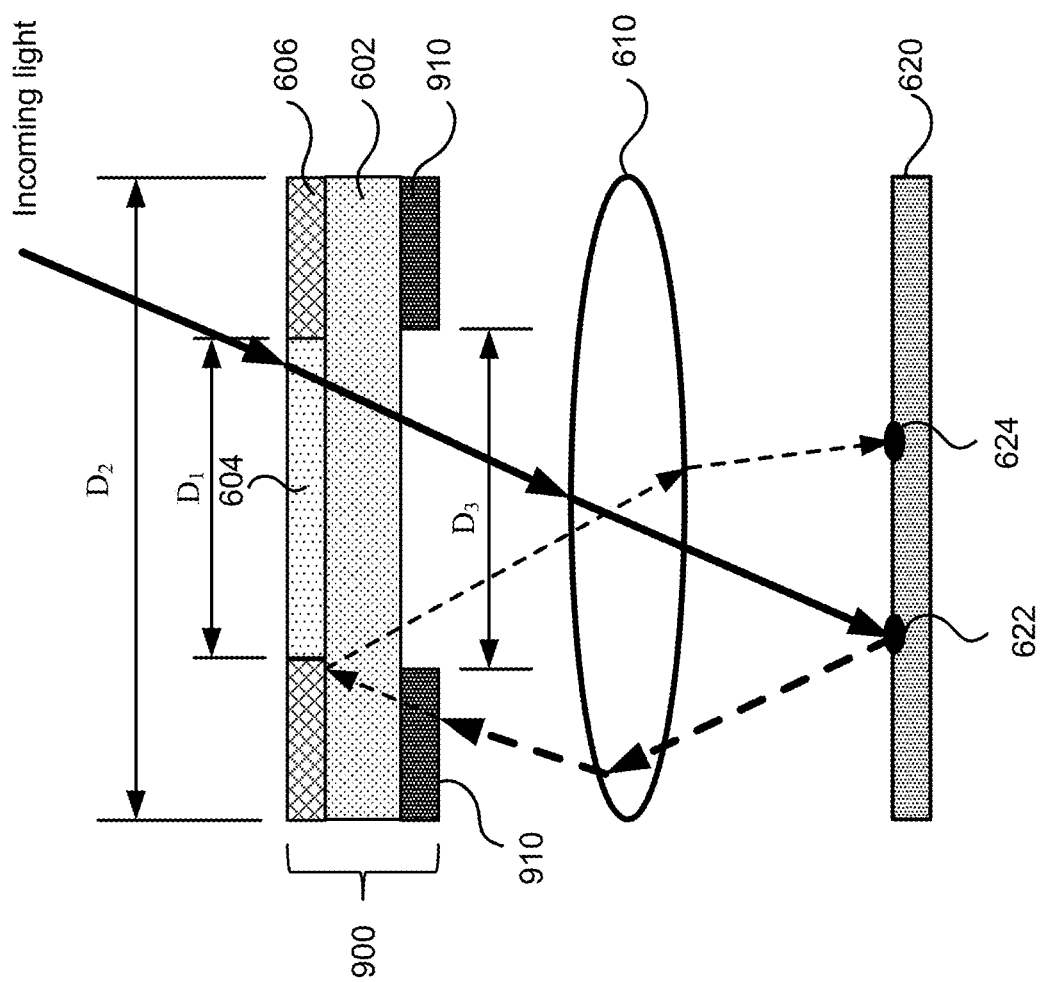
FIG. 9 illustrates a schematic cross-sectional diagram of a wavelength-selective filter that may be used in an imaging system according to some embodiments of the present invention.

FIG. 9 illustrates a schematic cross-sectional diagram of a wavelength-selective filter 900 that may be used in an imaging system and may prevent ghost image formation according to some embodiments. Similar to the wavelength-selective filter 600 illustrated in FIG. 6, the filter 900 includes a transparent substrate 602, a first multilayer thin film 604 formed on a front side of the substrate 602 having a circular shape with a first diameter $D_1$, and a second multilayer thin film 606 formed on the front side of the substrate 602 having an annular shape surrounding the first multilayer thin film 604 with an outer diameter of $D_2$. The first multilayer thin film 604 may be configured to have high transmittance values in both the visible and NIR wavelength ranges, and the second multilayer thin film 606 may be configured to have high transmittance values in only the NIR wavelength range, as discussed above.

The filter 900 may further include a third thin film 910 formed on a back side of the substrate 602. The third thin film 910 may have an annular shape with an outer diameter $D_2$ and an inner diameter $D_3$. $D_3$ may be slightly greater than the inner diameter $D_1$ of the second multilayer thin film 606, so as not to block incoming light rays entering the imaging system through the central region (e.g., the first multilayer thin film 604) of the wavelength-selective filter 600. In some embodiments, the value of $D_3$ may depend on the thickness of the substrate 602. For a relatively thin substrate 602, $D_3$ may be comparable to $D_1$. The third thin film 910 may be configured to have high absorption coefficients in the visible wavelength range and high transmittance values in the NIR wavelength range. Thus, the third thin film 910 may be referred to as a "black coating." As visible light reflected off of the image sensor 620 incident on the third thin film 910, a significant portion of it may be absorbed by the third thin film 910, and only a small portion of it may be transmitted by the third thin film 910 and incident on the back surface of the second multilayer thin film 606 as illustrated by the light path represented by the thinner dashed arrows in FIG. 9. Therefore, the intensity of the ghost image 624 may be significantly reduced as compared to the case where the filter 600 without the "black coating" is used as illustrated in FIG. 6.

Figure 10A:
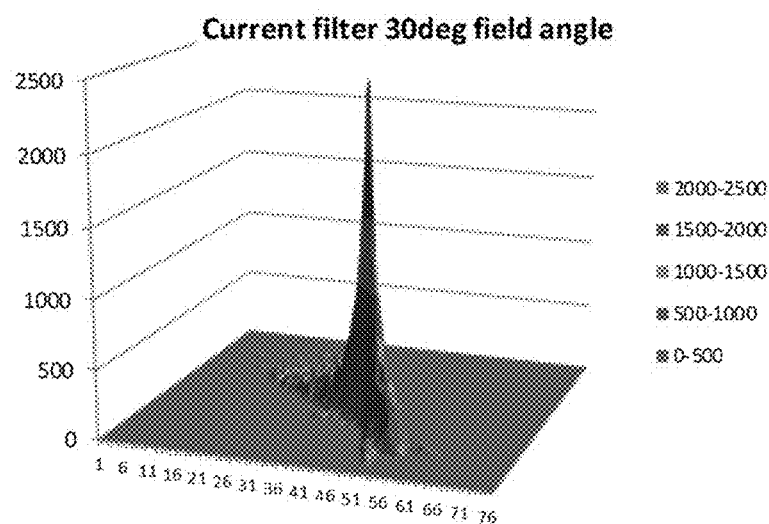
FIG. 10A shows the intensity distribution of a ghost image from ray tracing simulation with the wavelength-selective filter illustrated in FIG. 6 according to some embodiments of the present invention.
Figure 10B:
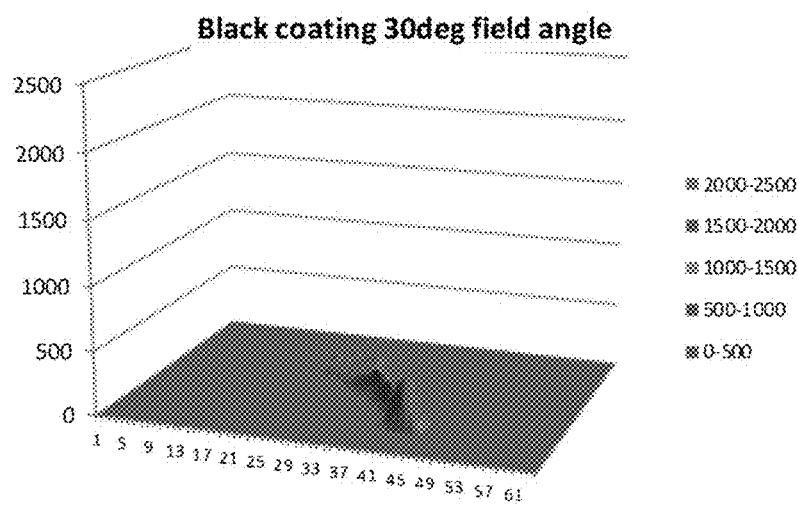
FIG. 10B shows the intensity distribution of a ghost image from ray tracing simulation with the wavelength-selective filter illustrated in FIG. 9 according to some embodiments of the present invention.
Figure 10C:
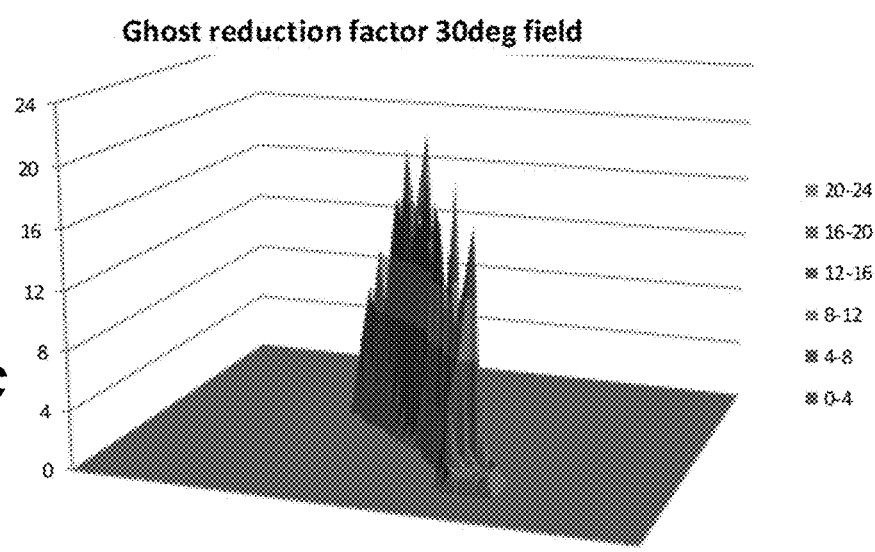
FIG. 10C shows the ratio of the ghost image intensity using the wavelength-selective filter illustrated in FIG. 6 and the ghost image intensity using the wavelength-selective filter illustrated in FIG. 9 according to some embodiments of the present invention.

FIG. 10A shows the intensity distribution of a ghost image from ray tracing simulation using the wavelength-selective filter 600 illustrated in FIG. 6 according to some embodiments. FIG. 10B shows the intensity distribution of a ghost image from ray tracing simulation using the wavelength-selective filter 900 illustrated in FIG. 9 that includes the "black coating" 910 according to some embodiments. As illustrated, the intensity of the ghost image may be significantly reduced by including the "black coating" 910 in the wavelength-selective filter 900. FIG. 10C shows the ratio of the ghost image intensity using the wavelength-selective filter 600 that does not include a "black coating" and the ghost image intensity using the wavelength-selective filter 900 with the "black coating" 910. As illustrated, the ghost image intensity can be reduced by as much as 20 fold by including the "black coating" 910 in the wavelength-selective filter 900.

Figure 11:
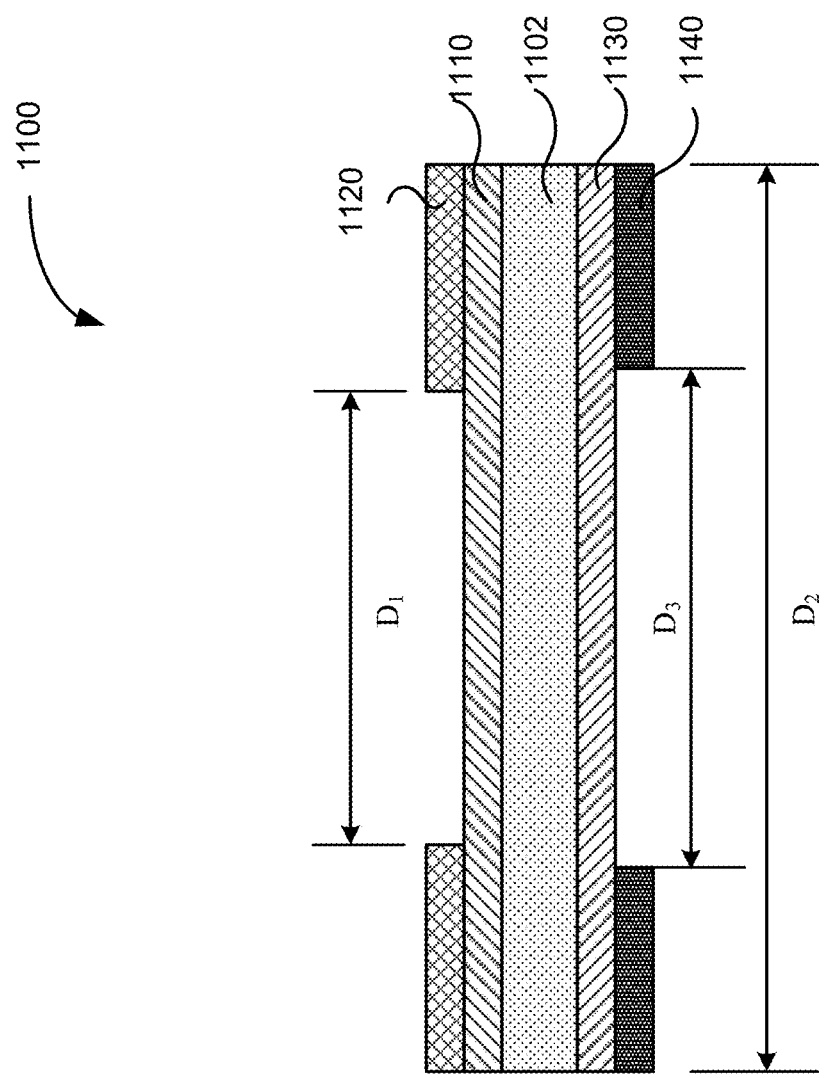
FIG. 11 illustrates a schematic cross-sectional diagram of a wavelength-selective filter according to some other embodiments of the present invention.

FIG. 11 illustrates a schematic cross-sectional diagram of a wavelength-selective filter 1100 according to some other embodiments. The filter 1100 may include a transparent substrate 1102, a first multilayer thin film 1110 formed on a front surface of the substrate 1102. The first multilayer thin film 1110 may be configured to have a first transmission band 430 in the NIR wavelength range and a second transmission band 440 in the visible wavelength range, as illustrated in FIG. 4A. The filter 1100 may further include a second multilayer thin film 1120 formed on the outer region of the first multilayer thin film 1110. The second multilayer thin film 1120 may be configured to be a high-pass filter similar to the wavelength-selective filter 500 illustrated in FIG. 5. The filter 1100 may further include an anti-reflective coating 1130 formed on a back surface of the substrate 1102. The anti-reflective coating 1130 can prevent or reduce the amount of incoming light being reflected off of the back surface of the substrate 1102. The filter 1100 may further include a "black coating" 1140 formed on the back surface of the anti-reflective coating 1130. The "black coating" 1140 may be configured to absorb visible light and transmit NIR light as discussed above.

Figure 12:
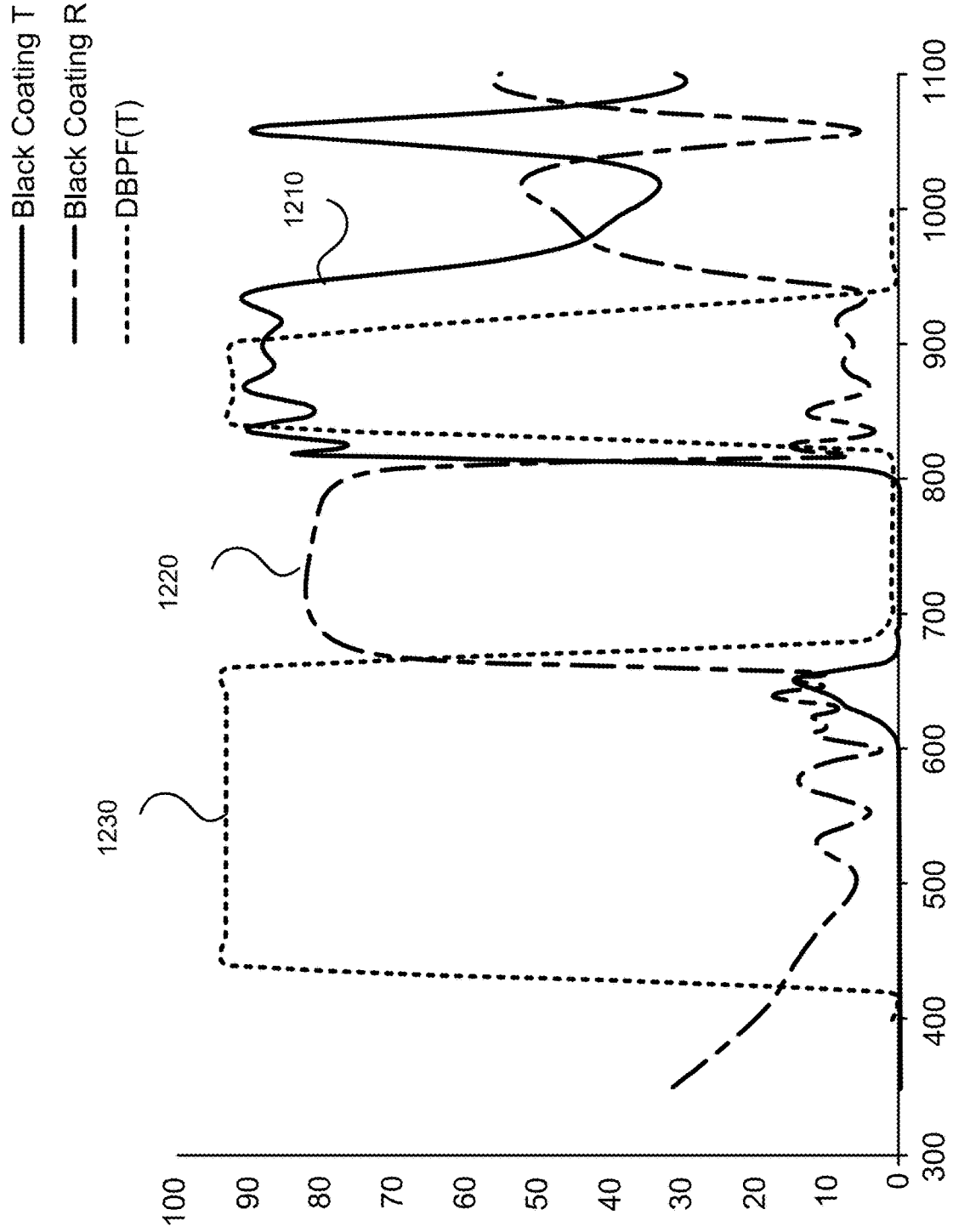
FIG. 12 shows a transmittance curve and a reflectance curve of a "black coating," as illustrated in FIG. 11, as a function of wavelength according to some embodiments of the present invention.

FIG. 12 shows a transmittance curve 1210 and a reflectance curve 1220 of the "black coating" 1140 as a function of wavelength according to some embodiments. A transmittance curve 1230 of the first multilayer thin film 1110 is also shown. As illustrated, the "black coating" 1140 can be configured to have low transmittance values for the visible wavelength range from about 400 nm to about 700 nm, and high transmittance values in the NIR wavelength range from about 800 nm to about 950 nm. The "black coating" 1140 may have relatively high reflectance values in the wavelength range from about 700 nm to about 800 nm, but this may not significantly affect the performance of the wavelength-selective filter 1100 as light in this wavelength range is mostly blocked by the first multilayer thin film 1110 as evidenced by the transmittance curve 1230 of the first multilayer thin film 1110.

Note that the "black coating" 1140 has both low reflectance values and low transmittance values in the visible wavelength range. Thus, the "black coating" 1140 may substantially absorb visible light, thereby preventing visible light reflected off of the image sensor 620 (as illustrated in FIG. 9) from being transmitted and incident on the back side of the second multilayer thin film 606 to form a ghost image 624 on the image sensor 620. In contrast, the anti-reflective coating 1130 is normally configured to have low reflectance values but high transmittance values. Thus, visible light reflected off of the image sensor 620 may be transmitted by the anti-reflective coating 1130 and be reflected by the second multilayer thin film 1120 to form the ghost image 624 on the image sensor 620 in absence of the "black coating" 1140.

Figure 13:
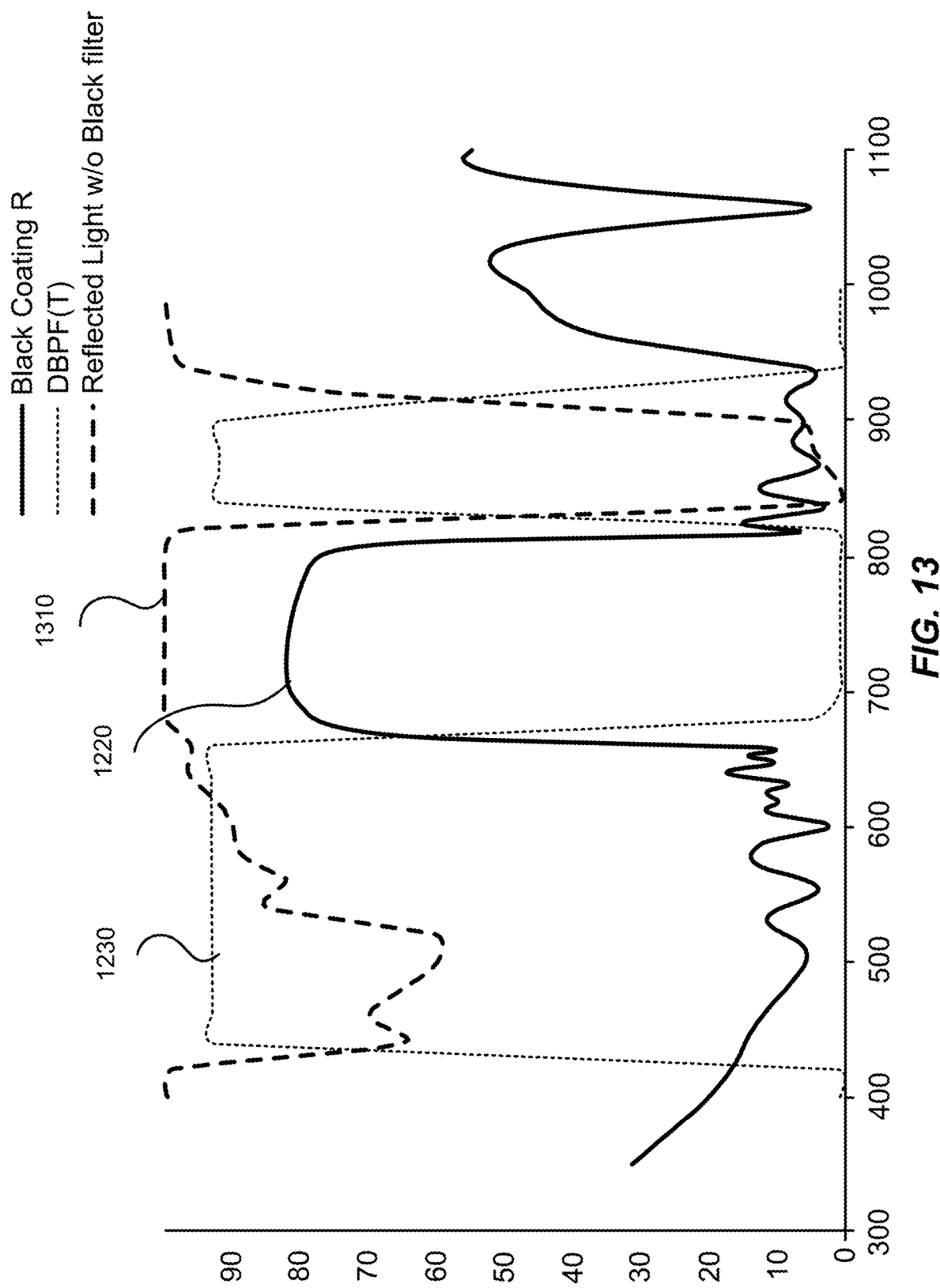
FIG. 13 shows a reflectance curve of a second multilayer thin film, as illustrated in FIG. 11, as a function of wavelength according to some embodiments of the present invention.

FIG. 13 shows a reflectance curve 1310 of the second multilayer thin film 1120 as a function of wavelength according to some embodiments. As illustrated, the second multilayer thin film 1120 may be configured to have low reflectance values (thus high transmittance values) only in the NIR wavelength range from about 800 nm to about 950 nm, and relatively high reflectance values for all other wavelengths. FIG. 13 also shows the reflectance curve 1220 of the "black coating" 1140, as well as the transmittance curve 1230 of the first multilayer thin film 1110. As illustrated, the low reflectance values of the "black coating" 1140 in the visible wavelength range may reduce reflection of light in the visible wavelength range, thereby reduce the intensity of the ghost image.

Figure 14:
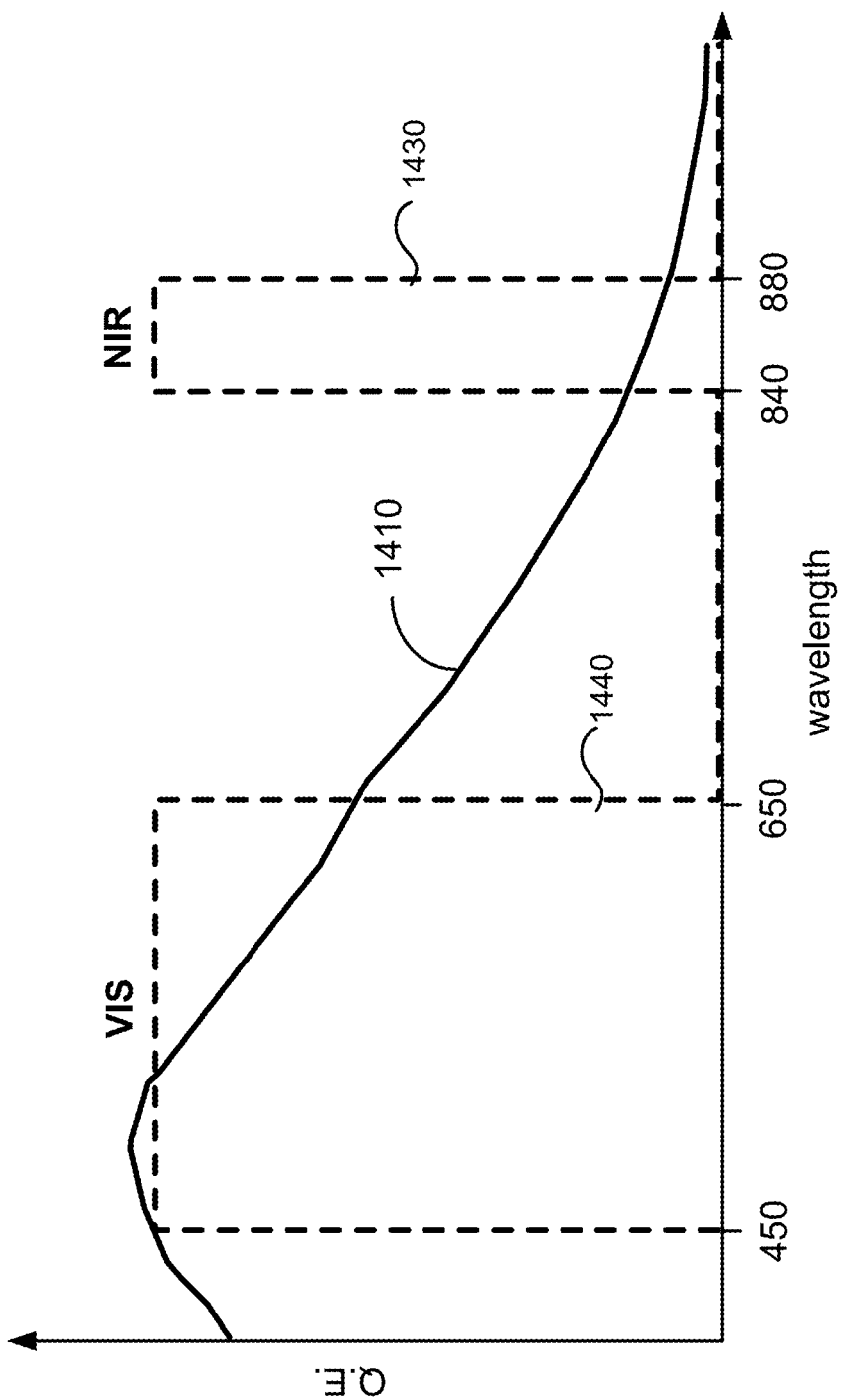
FIG. 14 shows an exemplary quantum efficiency (Q.E.) curve as a function of wavelength of an image sensor according to an embodiment of the present invention.

FIG. 14 shows an exemplary quantum efficiency (Q.E.) curve 1410 as a function of wavelength of an image sensor 220 that may be used in the imaging system 200 as illustrated in FIG. 2, according to an embodiment of the present invention. As illustrated, the quantum efficiency of the image sensor 220 in the visible (VIS) wavelength range can be as much as four times of the quantum efficiency in the NIR wavelength range. Therefore, a low ƒ/# lens may allow too much visible light to pass through the imaging lens 210 to the image sensor 220 and may saturate the image sensor 220.

Figure 15:
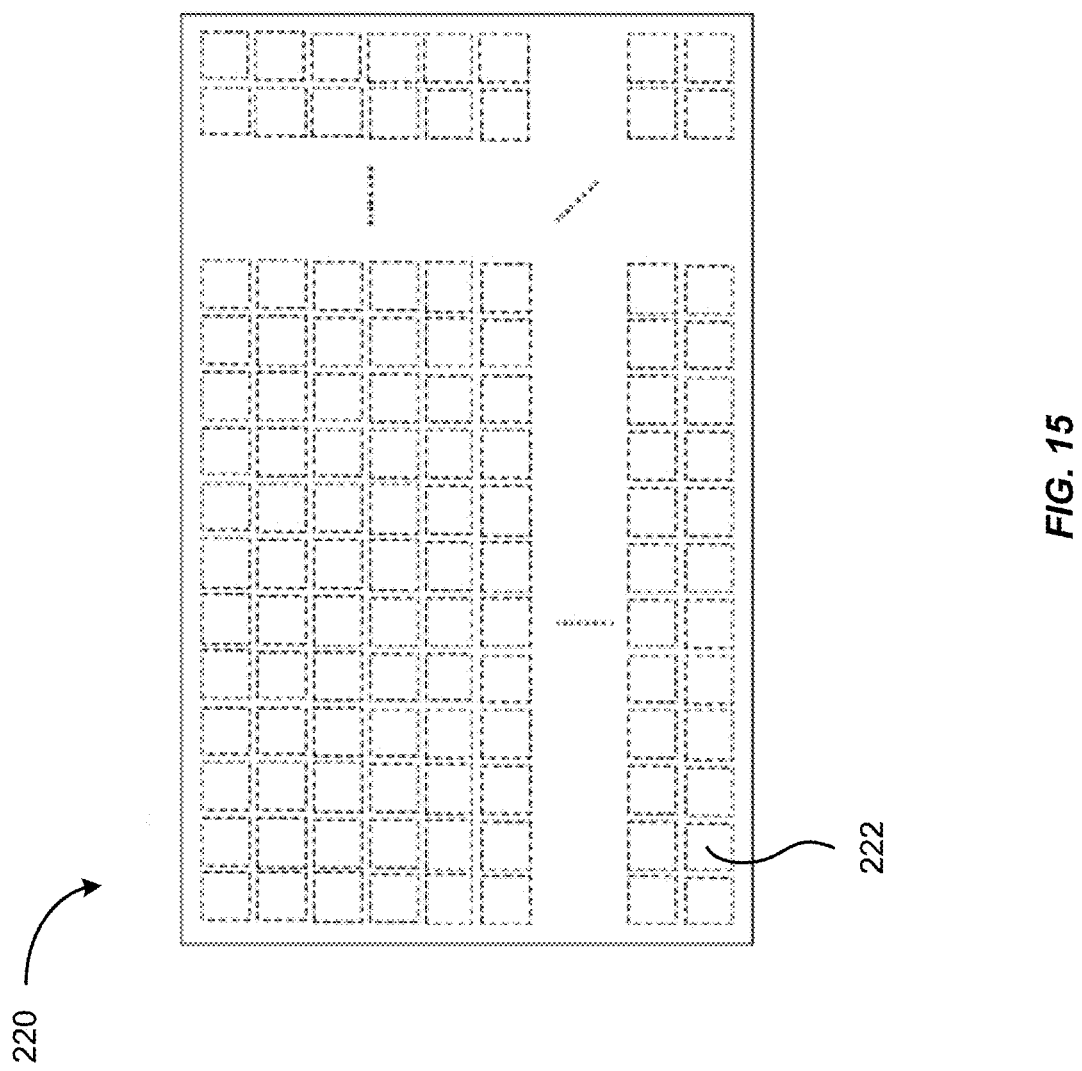
FIG. 15 illustrates schematically a plan view of an image sensor according to an embodiment of the present invention.

In some embodiments, the image sensor 220 in the imaging system 200 illustrated in FIG. 2 may comprise a charge-coupled device (CCD) or a complementary metal-oxide semiconductor (CMOS) device that converts light into electrons in a two-dimensional array of pixel cells. FIG. 15 illustrates schematically a plan view of the image sensor 220 according to an embodiment of the present invention. The image sensor 220 may include a two-dimensional array of pixel cells 222. The value of the accumulated charge of each pixel cell 222 may be read out to obtain an intensity distribution of the image. When the imaging system 200 is used for computer vision in the visible wavelength range, it may be desirable to have the highest possible spatial resolution at the image sensor 220. On the other hand, when the imaging system 200 is used for TOF depth sensing in the NIR wavelength range, it may be advantageous to have more light integration at the expense of pixel resolution to achieve better signal to noise ratio (SNR).

According to some embodiments of the present invention, the image sensor 220 may be operated at different resolution modes for the visible wavelength range and the NIR wavelength range. In one embodiment, the image sensor 220 may be operated at the native resolution for the visible wavelength range, i.e., at the maximum possible resolution that the physical pixel size of the image sensor can support. Thus, for computer vision in the visible wavelength range, the image sensor 220 may be operated such that the accumulated charge in each pixel cell 222 is read out.

Figure 16:
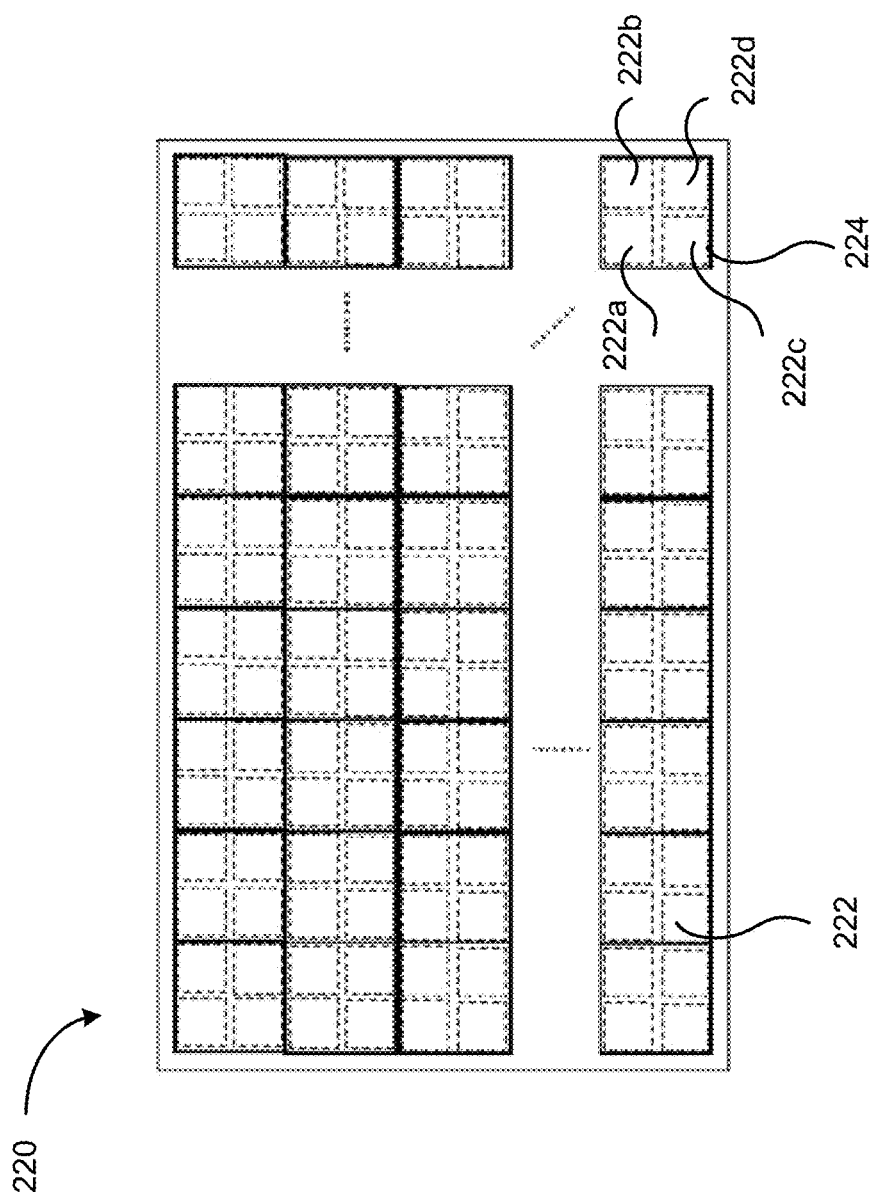
FIG. 16 illustrates schematically a mode of operating an image sensor according to an embodiment of the present invention.

For the NIR wavelength range, the image sensor 220 may be operated at a resolution that is lower than the native resolution for greater light integration. FIG. 16 illustrates schematically a mode of operating the image sensor 220 according to an embodiment of the present invention. The two-dimensional array of pixel cells 222 may be binned into 2×2 groups 224. Each group 224 includes four pixel cells 222a-222d. This mode of operation can be referred to as image sensor pixel binning. In other embodiments, other binning configurations may be used. For example, the pixel cells 222 of the image sensor 220 may be binned into n×n groups, where n is an integer greater than one. The pixels of the image sensor may also be binned into m×n groups, where m and n are integers and at least one of m and n is greater than one, and m may or may not be equal to n. By binning the pixels, the spatial resolution may be reduced as compared to the native resolution. When the image sensor 220 is used in an imaging system that includes the wavelength-selective filter 214, 500, 600, 900, or 1100, since the spatial resolution of the imaging system (e.g., as measured by modulation transfer function or MTF) may be lower in the NIR wavelength range because of the greater effective aperture size, the reduction of spatial resolution at the image sensor may not be detrimental. With the greater light integration afforded by binning, a relatively low power laser source may be used for active illumination. Lower power illumination may lead to lower cost, smaller form factor, and lower power consumption, among other advantages.

In one embodiment, binning may be performed at the analog level, where the value of the total accumulated charge for the m×n pixels in each group is read out. In such cases, the readout noise is not added. In another embodiment, binning may be performed at the digital level, where the value of the accumulated charge for each pixel is read out, and the readout values for the m×n pixels in each group are then summed. In such cases, the readout noise is added in the summation process. Thus, the later embodiment may be more appropriate where the readout noise is relatively low.

As described above, the imaging system 200 illustrated in FIG. 2 includes an imaging lens 210 that may be characterized by a lower f-number for NIR light and a higher f-number for visible light by utilizing a wavelength-selective filter 214 at its aperture stop, and an image sensor 220 that may be operated at a lower resolution mode for NIR light using pixel binning and at a higher resolution mode for visible light. The imaging system 200 may be suitable for use as a TOF depth sensor with active illumination in the NIR wavelength range where a faster lens and more light integration are desired, as well as a computer vision sensor with passive illumination in the visible wavelength range where higher image resolution and greater depth of field are desired.

Figure 17:
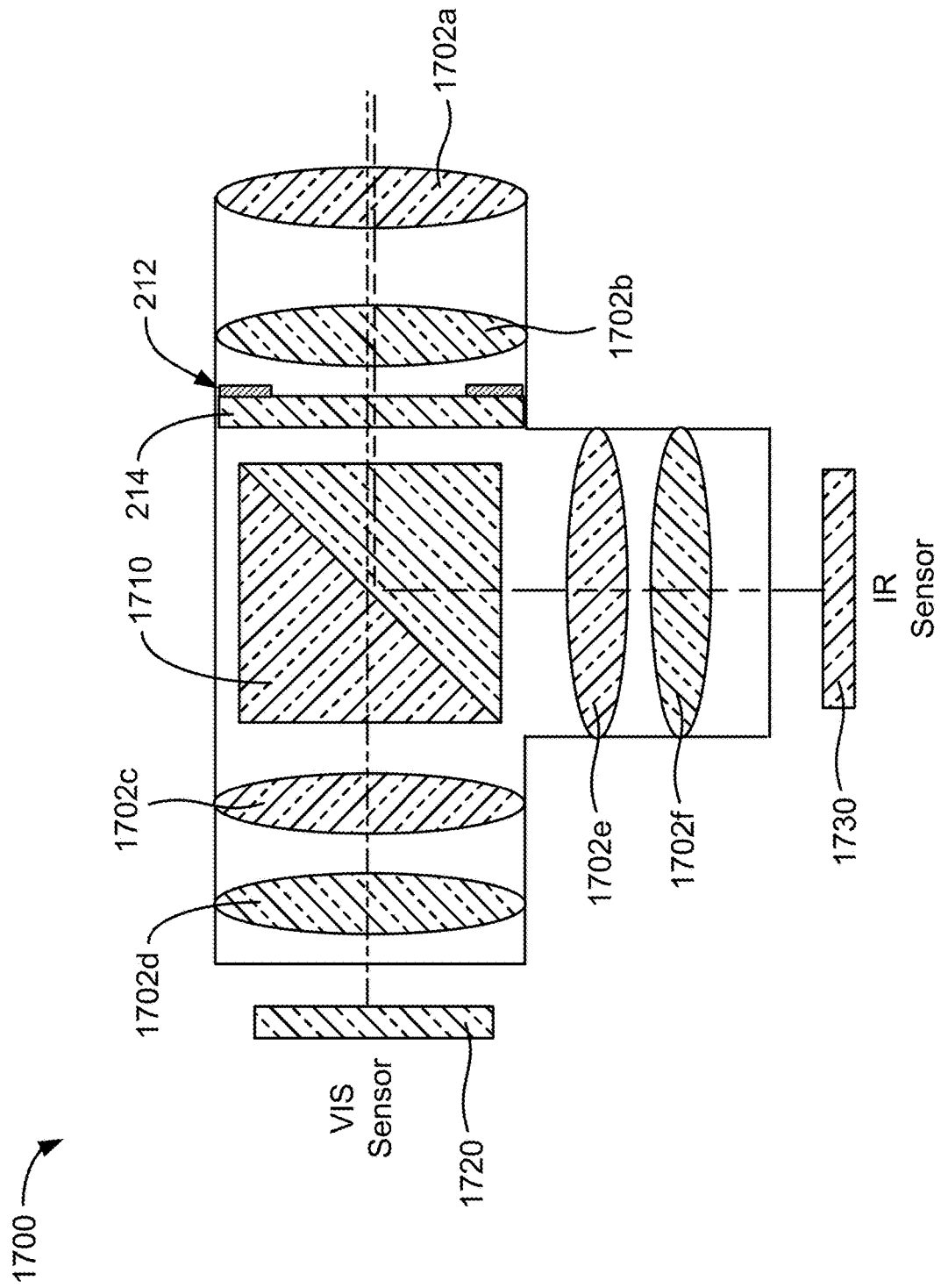
FIG. 17 illustrates schematically an imaging system according to another embodiment of the present invention.

FIG. 17 is a schematic diagram illustrating an imaging system 1700 according to another embodiment of the present invention. The imaging system 1700 may include a plurality of lens elements 1702a-1702f, and a filter 214 positioned at the aperture stop 212. The imaging system 800 may further include a dichroic beam splitter 1710 positioned in the optical path after the filter 214. The dichroic beam splitter 1710 may be configured to transmit visible light along a first optical path, and reflect IR light along a second optical path. The imaging system 1700 may further include a first image sensor 1720 (VIS sensor) for visible light, and a second image sensor 1730 (IR sensor) for IR light. The first image sensor 1720 is disposed along the first optical path and configured to receive the visible light transmitted by the dichroic beam splitter 1710. The second image sensor 1730 is disposed along the second optical path and configured to receive the IR light reflected by the dichroic beam splitter 1710. In this fashion, visible light and IR light may be imaged by the first image sensor 1720 and the second image sensor 17830, respectively, at the same time. In this configuration, the first optical path to the first image sensor 1720 and the second optical path to the second image sensor 1730 are perpendicular to each other.

Figure 18:
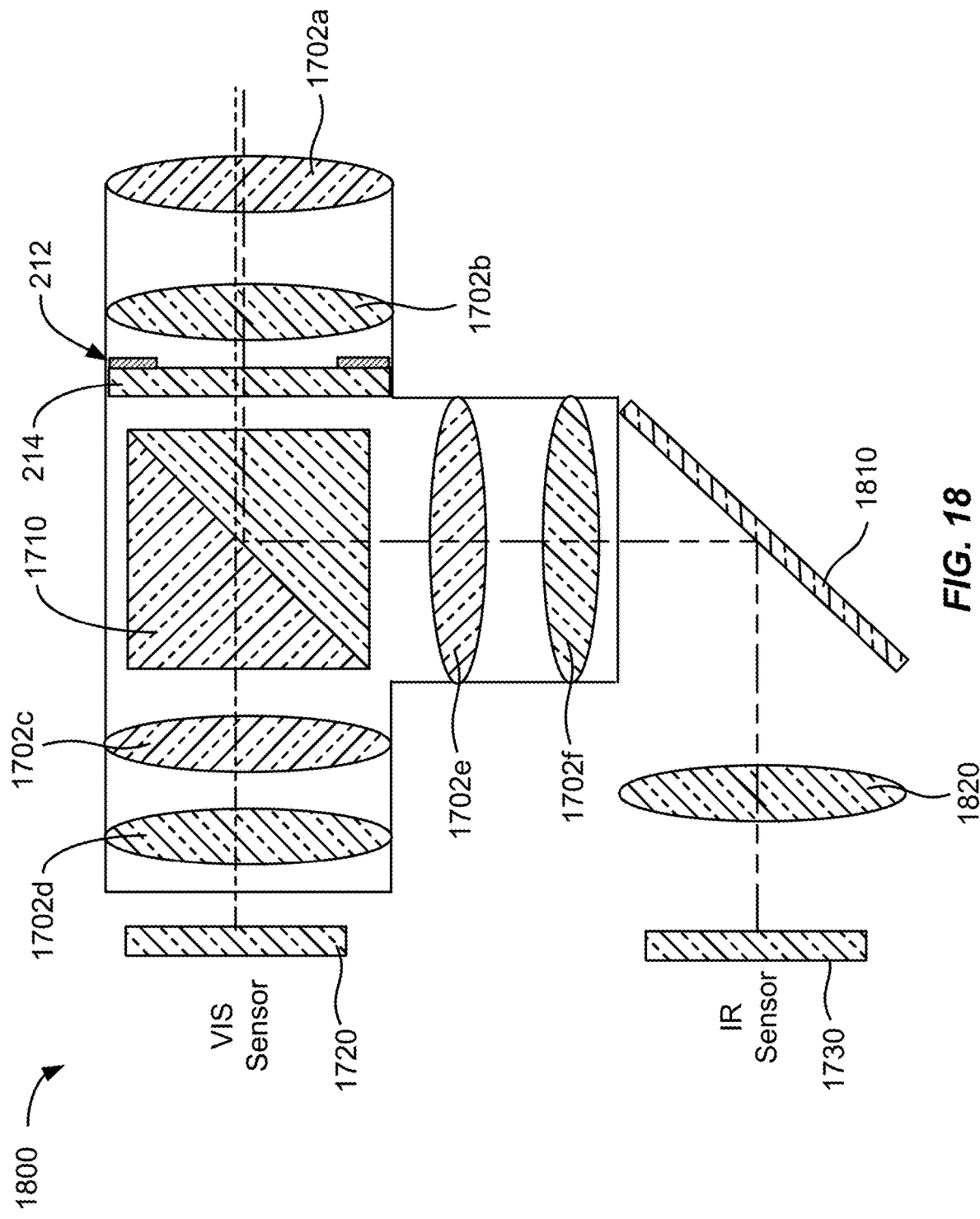
FIG. 18 illustrates schematically an imaging system according to a further embodiment of the present invention.

FIG. 18 is a schematic diagram illustrating an imaging system 1800 according to yet another embodiment of the present invention. The imaging system 1800 is similar to the imaging system 1700 in that it also includes a dichroic beam splitter 1710 positioned after the filter 214, and configured to transmit visible light along a first optical path and to reflect IR light along a second optical path. The imaging system 1800 further includes a mirror 1810 positioned along the second optical path and configured to reflect IR light toward the second image sensor 1730. In this configuration, the first optical path to the first image sensor 1720 and the second optical path to the second image sensor 1730 are parallel to each other. The imaging system 1800 may further include a lens element 1820 positioned after the mirror 1810 along the second optical path for refocusing IR light at the second image sensor 1730.

Figure 19:
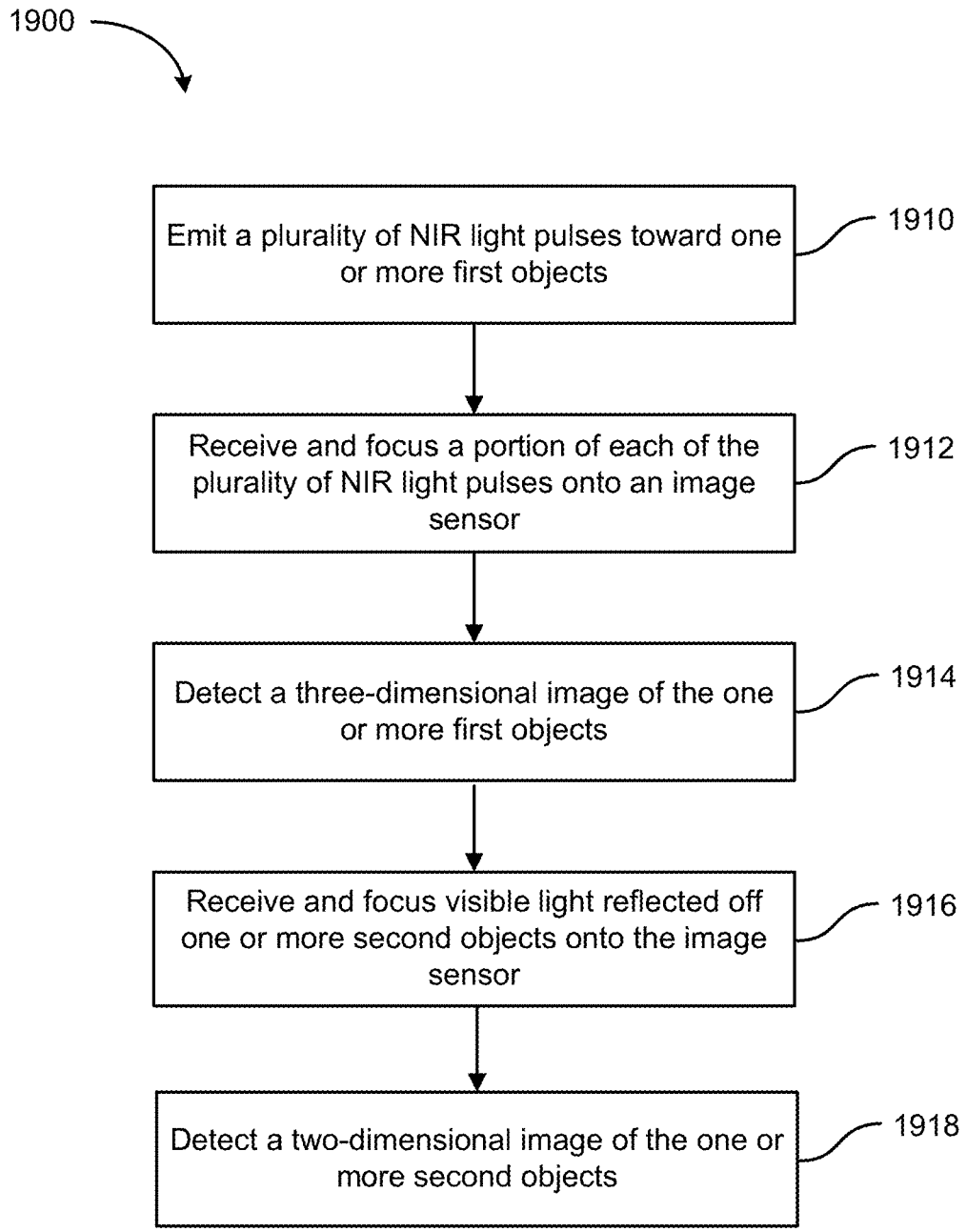
FIG. 19 is a simplified flowchart illustrating a method of operating an imaging system according to an embodiment of the present invention.

FIG. 19 is a simplified flowchart illustrating a method 1900 of operating an imaging system according to an embodiment of the present invention. The method 1900 includes performing three-dimensional sensing using the imaging system. In some embodiments, performing the three-dimensional sensing is performed in a first time slot. The imaging system may include a near infrared (NIR) light source, an imaging lens, and an image sensor positioned at an image plane of the imaging lens.

In an embodiment, three-dimensional sensing may be performed by: emitting, using the NIR light source, a plurality of NIR light pulses toward one or more first objects (1910). A portion of each of the plurality of NIR light pulses may be reflected off of the one or more first objects. The method also includes receiving and focusing, using the imaging lens, the portion of each of the plurality of NIR light pulses reflected off of the one or more first objects onto the image sensor (1912). The imaging lens may include an aperture stop and a wavelength-selective filter positioned at the aperture stop. The wavelength-selective filter may have a first region and a second region surrounding the first region. In one embodiment, the wavelength-selective filter is configured to transmit NIR light through both the first region and the second region, and to transmit visible light through the first region only. The method further includes detecting, using the image sensor, a three-dimensional image of the one or more first objects by determining a time of flight for the portion of each of the plurality of NIR light pulses from emission to detection (1914).

The method 1900 further includes performing computer vision in a second time slot using the imaging system. Performing computer vision may be performed in a second time slot following the first time slot. In an embodiment, computer vision may be performed by receiving and focusing, using the imaging lens, visible light from an ambient light source reflected off of one or more second objects onto the image sensor (1916), and detecting, using the image sensor, a two-dimensional intensity image of the one or more second objects (1918). In some embodiments, some of the second objects can be the same as some of the first objects that were imaged in steps 1910-1914 described above.

According to an embodiment of the present invention, the image sensor includes a two dimensional array of pixels. In some embodiments, detecting the three-dimensional image of the one or more first objects is performed by reading out a total amount of charge for each group of m×n pixels, where m and n are integers, and at least one of m and n is greater than one. In some other embodiments, detecting the three-dimensional image of the one or more first objects is performed by reading out an amount of charge for each pixel of the two-dimensional array of pixels, and calculating a total amount of charge for each group of m×n pixels by summing the amount of charge of the m×n pixels in each group, where m and n are integers, and at least one of m and n is greater than one.

In one embodiment, detecting the two-dimensional intensity image of the one or more second objects is performed by reading out an amount of charge for each pixel of the two-dimensional array of pixels.

In some embodiments, the method 1900 may include alternately performing three-dimensional sensing and computer vision in sequential time slots, and the duration of each time slot may range from about 1 ms to about 50 ms.

In some other embodiments, the method 1900 may include performing three-dimensional sensing and computer vision simultaneously using an imaging system such as that illustrated in FIG. 17 or FIG. 18.

It should be appreciated that the specific steps illustrated in FIG. 19 provide a particular method of 1900 according to an embodiment of the present invention. Other sequences of steps may also be performed according to alternative embodiments. For example, alternative embodiments of the present invention may perform the steps outlined above in a different order. Moreover, the individual steps illustrated in FIG. 19 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An imaging system comprising:
    a first set of lens elements configured to receive and transmit light in a near infrared (NIR) wavelength range and light in a visible wavelength range;
    an aperture stop;
    a filter positioned at the aperture stop, the filter including:
        a central region with a first linear dimension, the central region configured to transmit both the light in the NIR wavelength range and the light in the visible wavelength range transmitted through the first set of lens elements; and
        an outer region surrounding the central region with a second linear dimension greater than the first linear dimension, the outer region configured to transmit only the light in the NIR wavelength range transmitted through the first set of lens elements;
    a dichroic beam splitter configured to direct the light in the NIR wavelength range transmitted through the filter along a first optical path, and to direct the light in the visible wavelength range transmitted through the filter along a second optical path, wherein the filter is disposed between the first set of lens elements and the dichroic beam splitter;
    a second set of lens elements positioned along the first optical path, wherein the first set of lens elements, the aperature stop, the filter, and the second set of lens elements form a first lens system, the first lens system defining a first focal plane;

a first image sensor positioned along the first optical path and at the first focal plane of the first lens system, the first image sensor configured to detect a first image formed by the light in the NIR wavelength range; and
a second image sensor positioned along the second optical path and configured to detect a second image formed by the light in the visible wavelength range.

2. The imaging system of claim 1 wherein the first image comprises a three-dimensional image of one or more objects based on time-of-flight.

3. The imaging system of claim 1 wherein the second image comprises a two-dimensional image of one or more objects.

4. The imaging system of claim 1 wherein the first lens system is characterized by an f-number for light in the NIR wavelength range based on the second linear dimension.

5. The imaging system of claim 4 wherein the f-number ranges from 1.0 to 1.4.

6. The imaging system of claim 1 further comprising a third set of lens elements positioned along the second optical path between the dichroic beam splitter and the second image sensor, wherein the first set of lens elements, the aperture stop, the filter, the dichroic beam splitter, and the third set of lens elements form a second lens system, the second lens system defining a second focal plane, and wherein the second image sensor is positioned at the second focal plane of the second lens system.

7. The imaging system of claim 6 wherein the second lens system is characterized by an f-number for light in the visible wavelength range based on the first linear dimension.

8. The imaging system of claim 7 wherein the f-number ranges from 2.0 to 2.8.

9. The imaging system of claim 1 wherein the central region of the filter has a circular shape, and the outer region of the filter has a annular shape, and wherein the first linear dimension is a diameter of the central region, and the second linear dimension is an outer diameter of the outer region.

10. The imaging system of claim 9 wherein a ratio of the first linear dimension and the second linear dimension ranges from 0.4 to 0.6.

11. The imaging system of claim 1 further comprising a mirror positioned along the first optical path between the dichroic beam splitter and the first image sensor.

12. The imaging system of claim 11 further comprising a fourth lens element, wherein the mirror is positioned along the first optical path between the second set of lens elements and the fourth lens element.

13. The imaging system of claim 1 further comprising an NIR light source configured to emit a plurality of NIR light pulses toward one or more objects in front of the first set of lens elements, wherein a portion of each of the plurality of NIR light pulses is reflected off of the one or more objects, and wherein the light in the NIR wavelength by which the first image is formed includes the portion of each of the plurality of NIR light pulses reflected off of the one or more objects.

14. A method of operating an imaging system the method comprising:
emitting, using a near infrared (NIR) light source of the imaging system, a plurality of NIR light pulses toward one or more first objects, wherein a portion of each of the plurality of NIR light pulses is reflected off of the one or more first objects;
receiving and transmitting, using a first set of lens elements of the imaging system, the portion of each of the plurality of NIR light pulses reflected off of the one or more first objects and visible light from an ambient light source reflected or scattered off of one or more second objects;
receiving, using a wavelength-selective filter positioned at an aperature stop of the imaging system, the portion of each of the plurality of NIR light pulses reflected off of the one or more first objects and the visible light from an ambient light source reflected or scattered off of one or more second objects transmitted by the first set of lens elements, wherein the wavelength-selective filter includes:
a central region with a first linear dimension, the central region configured to transmit both the portion of each of the plurality of NIR light pulses reflected off of the one or more first objects and the visible light from an ambient light source reflected or scattered off of one or more second objects transmitted by the first set of lens elements; and
an outer region surrounding the central region with a second linear dimension greater than the first linear dimension, the outer region configured to transmit only the the portion of each of the plurality of NIR light pulses reflected off of the one or more first objects transmitted through the first set of lens elements;
directing, using a dichroic beam splitter of the imaging system, the portion of each of the plurality of NIR light pulses transmitted through the wavelength-selective filter along a first optical path;
receiving and transmitting, using a second set of lens elements of the imaging system positioned along the first optical path, the portion of each of the plurality of NIR light pulses, wherein the first set of lens elements, the aperature stop, the wavelength-selective filter, and the second set of lens elements form a first lens system, the first lens system defining a first focal plane;
detecting, using a first image sensor of the imaging system that is disposed along the first optical path at the first focal plane of the first lens system, the portion of each of the plurality of NIR light pulses;
forming a three-dimensional image of the one or more first objects by determining a time of flight for the portion of each of the plurality of NIR light pulses from emission to detection;
directing, using the dichroic beam splitter, the visible light transmitted through the wavelength-selective filter along a second optical path; and
detecting, using a second image sensor of the imaging system that is disposed along the second optical path, a two-dimensional intensity image of the one or more second objects.

15. The method of claim 14 wherein the central region of the wavelength-selective filter has a circular shape characterized by a first diameter, and the outer region of the wavelength-selective filter has a annular shape characterized by an outer second diameter greater than the first diameter.

16. The method of claim 15 wherein a ratio of the first diameter and the outer second diameter ranges from 0.4 to 0.6.

17. The method of claim 15 wherein the imaging system further comprises a third set of lens elements positioned along the second optical path between the dichroic beam splitter and the second image sensor, and wherein the first set of lens elements, the aperture stop, the wavelength-selective filter, the dichroic beam splitter, and the third set of lens elements form a second lens system, the second lens system defining a second focal plane, and wherein the second image sensor is positioned at the second focal plane of the second lens system.

18. The method of claim 17 wherein the first lens system is characterized by a first f-number for light in the NIR wavelength range based on the outer second diameter, and the second lens system is characterized by a second f-number for light in the visible wavelength range based on the first diameter.

\* \* \* \* \*